United States Patent
Myung et al.

(10) Patent No.: US 11,456,817 B2
(45) Date of Patent: Sep. 27, 2022

(54) METHOD AND APPARATUS FOR TRANSMITTING AND RECEIVING SIGNAL IN WIRELESS COMMUNICATION SYSTEM

(71) Applicant: LG ELECTRONICS INC., Seoul (KR)

(72) Inventors: Sechang Myung, Seoul (KR); Seonwook Kim, Seoul (KR); Joonkui Ahn, Seoul (KR); Suckchel Yang, Seoul (KR); Hyunho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 101 days.

(21) Appl. No.: 16/993,739

(22) Filed: Aug. 14, 2020

(65) Prior Publication Data

US 2021/0050933 A1  Feb. 18, 2021

Related U.S. Application Data

(60) Provisional application No. 62/893,118, filed on Aug. 28, 2019, provisional application No. 62/887,666, filed on Aug. 15, 2019.

(30) Foreign Application Priority Data

Aug. 27, 2019  (KR) .......... 10-2019-0104787
Feb. 14, 2020  (KR) .......... 10-2020-0018075

(51) Int. Cl.
*H04L 1/00* (2006.01)
*H04L 41/0806* (2022.01)
(Continued)

(52) U.S. Cl.
CPC ........ *H04L 1/0009* (2013.01); *H04L 41/0806* (2013.01); *H04W 72/0413* (2013.01); *H04W 72/14* (2013.01)

(58) Field of Classification Search
CPC .............. H04L 1/0009; H04L 41/0806; H04L 1/1671; H04L 1/1861; H04L 5/0044;
(Continued)

(56) References Cited

U.S. PATENT DOCUMENTS

2020/0228248 A1* 7/2020 Islam ............... H04L 1/1861
2020/0351861 A1* 11/2020 Mukherjee .......... H04L 1/1671
(Continued)

*Primary Examiner* — Walli Z Butt
(74) *Attorney, Agent, or Firm* — Dentons US LLP

(57) ABSTRACT

A method of a user equipment (UE) in a wireless communication system includes receiving resource allocation information related to a configured grant (CG)-based uplink transmission, receiving configuration information indicating multiplexing between CG uplink control information (CG UCI) and hybrid automatic repeat request acknowledgement (HARQ-ACK) information, performing joint encoding of the CG UCI and the HARQ-ACK information based on the configuration information, and transmitting a CG physical uplink shared channel (CG PUSCH) based on the resource allocation information. The joint-encoded information is multiplexed in the CG PUSCH. A beta offset value corresponding to one of a first index, a second index, or a third index related to a beta offset for the HARQ-ACK information is applied to the joint encoding.

11 Claims, 22 Drawing Sheets

(51) Int. Cl.
*H04W 72/04* (2009.01)
*H04W 72/14* (2009.01)

(58) Field of Classification Search
CPC .................. H04L 5/0053; H04L 5/0055; H04L 5/0094; H04L 1/0031; H04W 72/0413; H04W 72/14
See application file for complete search history.

(56) References Cited

U.S. PATENT DOCUMENTS

2020/0383132 A1* 12/2020 Yang ..................... H04L 5/0053
2021/0051702 A1* 2/2021 Bhattad ............. H04W 72/0413
2021/0410093 A1* 12/2021 Ren ..................... H04L 27/2607

* cited by examiner

FIG. 9
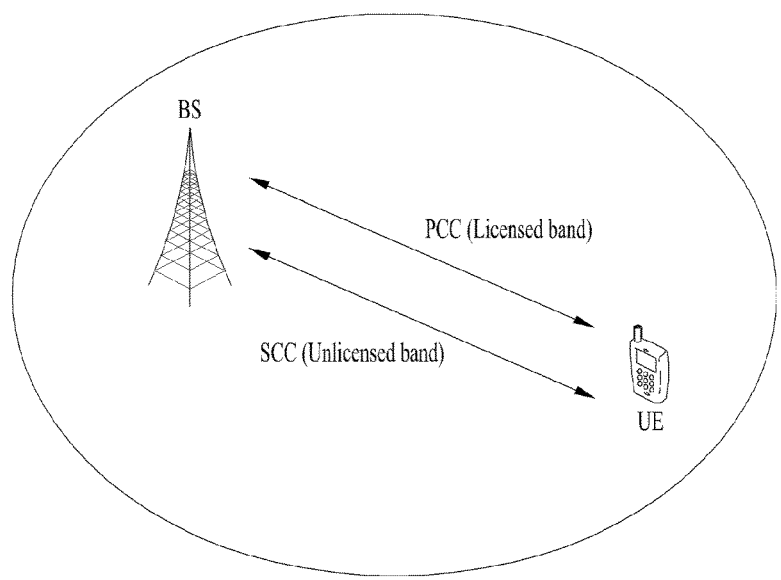
(a) Carrier aggregation between L-band and U-band
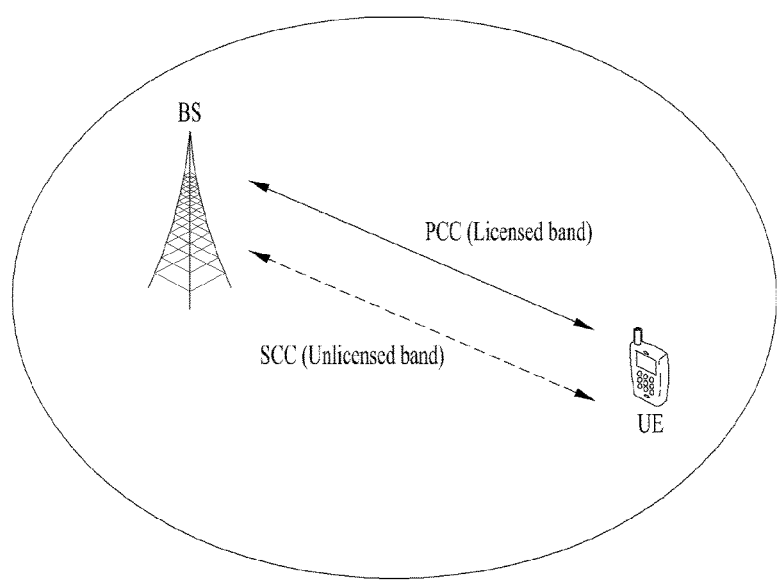
(b) Standalone U-band(s)

FIG. 12
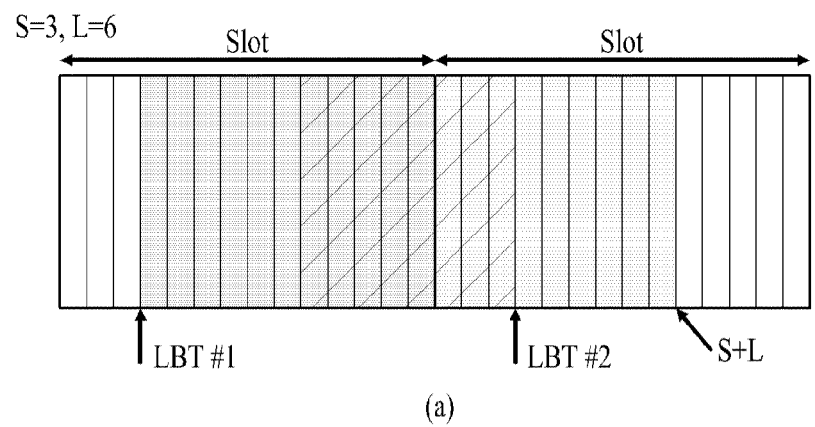
(a)
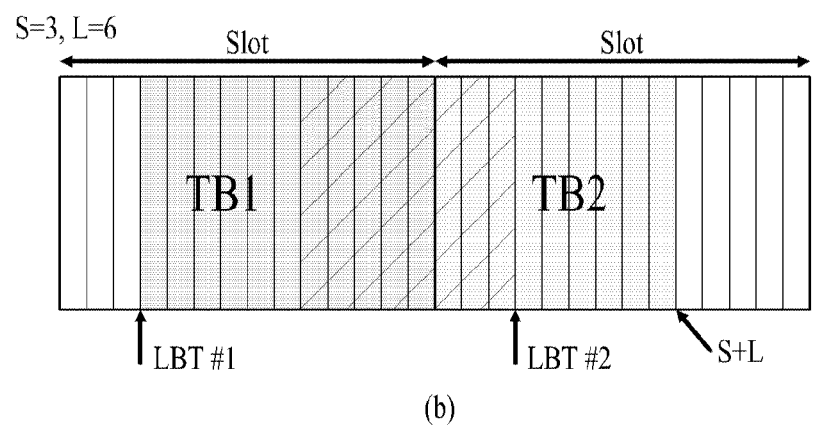
(b)

FIG. 14
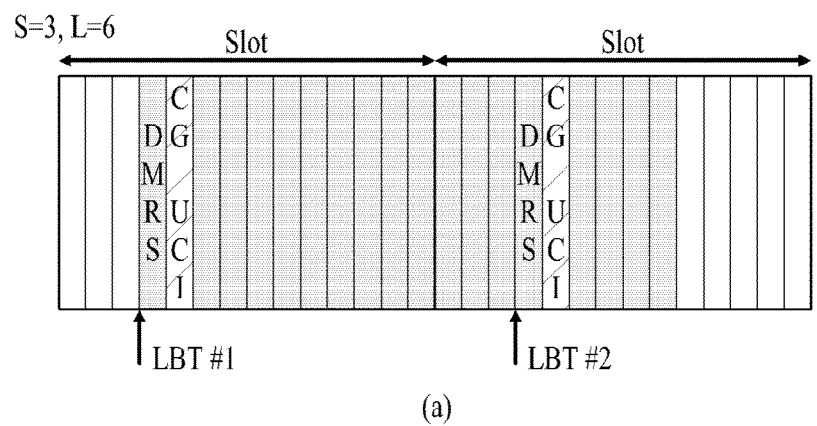
(a)
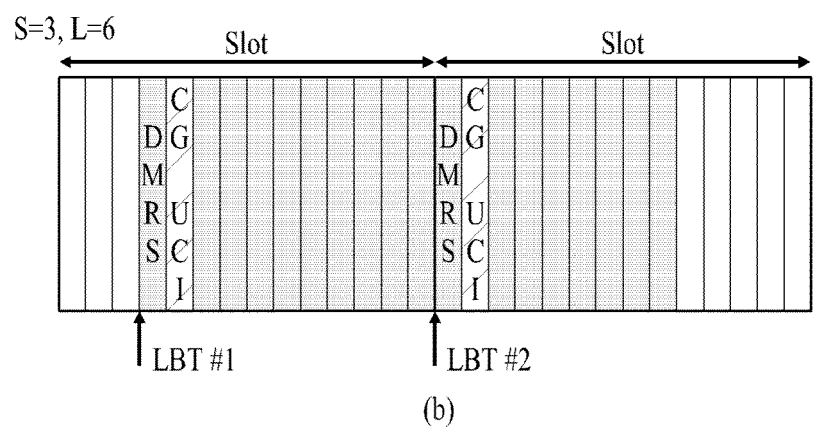
(b)

US 11,456,817 B2

METHOD AND APPARATUS FOR TRANSMITTING AND RECEIVING SIGNAL IN WIRELESS COMMUNICATION SYSTEM

This application claims the benefit of U.S. provisional application No. 62/887,666, filed on Aug. 15, 2019, Korean Patent Application No. 10-2019-0104787, filed on Aug. 27, 2019, U.S. provisional application No. 62/893,118, filed on Aug. 28, 2019 and Korean Patent Application No. 10-2020-0018075, filed on Feb. 14, 2020, which is hereby incorporated by reference as if fully set forth herein.

TECHNICAL FIELD

The present disclosure relates to a method and apparatus for transmitting and receiving a signal in a wireless communication system.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

Disclosure

Technical Problem

Provided are a method and apparatus for efficiently performing a wireless signal transmission and reception procedure.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to one aspect of the present disclosure, a method performed by a user equipment (UE) in a wireless communication system includes receiving resource allocation information related to a configured grant (CG)-based uplink transmission, receiving configuration information indicating multiplexing between CG uplink control information (CG UCI) and hybrid automatic repeat request acknowledgement (HARQ-ACK) information, performing joint encoding on the CG UCI and the HARQ-ACK information based on the configuration information, and transmitting a CG physical uplink shared channel (CG PUSCH) based on the resource allocation information. The joint-encoded information is multiplexed on the CG PUSCH. A beta offset value corresponding to one of a first index, a second index, or a third index related to a beta offset for the HARQ-ACK information is applied to the joint encoding.

According to another aspect of the present disclosure, a UE in a wireless communication system includes at least one transceiver, at least one processor, and at least one computer memory operatively connected to the at least one transceiver and the at least one processor and, when executed, causing the at least one transceiver and the at least one processor to perform an operation. The operation includes receiving resource allocation information related to a CG-based uplink transmission, receiving configuration information indicating multiplexing between CG UCI and HARQ-ACK information, performing joint encoding on the CG UCI and the HARQ-ACK information based on the configuration information, and transmitting a CG PUSCH based on the resource allocation information. The joint-encoded information is multiplexed on the CG PUSCH. A beta offset value corresponding to one of a first index, a second index, or a third index related to a beta offset for the HARQ-ACK information is applied to the joint encoding.

According to another aspect of the present disclosure, an apparatus for a UE includes at least one processor, and at least one computer memory operatively connected to the at least one processor and, when executed, causing the at least one processor to perform an operation. The operation includes receiving resource allocation information related to a CG-based uplink transmission, receiving configuration information indicating multiplexing between CG UCI and HARQ-ACK information, performing joint encoding on the CG UCI and the HARQ-ACK information based on the configuration information, and transmitting a CG PUSCH based on the resource allocation information. The joint-encoded information is multiplexed on the CG PUSCH. A beta offset value corresponding to one of a first index, a second index, and a third index related to a beta offset for the HARQ-ACK information is applied to the joint encoding.

According to another aspect of the present disclosure, a processor-readable medium storing at least one instruction which, when executed, causes at least one processor to perform an operation is provided. The operation includes receiving resource allocation information related to a CG-based uplink transmission, receiving configuration information indicating multiplexing between CG UCI and HARQ-ACK information, performing joint encoding on the CG UCI and the HARQ-ACK information based on the configuration information, and transmitting a CG PUSCH based on the resource allocation information. The joint-encoded information is multiplexed on the CG PUSCH. A beta offset value corresponding to one of a first index, a second index, or a third index related to a beta offset for the HARQ-ACK information is applied to the joint encoding.

The first index, the second index, and the third index may correspond to a first range, a second range, and a third range, respectively, and the first range, the second range, and the third range may be distinguished from each other based on a sum of a payload size of the CG UCI and a payload size of the HARQ-ACK information.

The beta offset value may be determined based on an index corresponding to a range to which the sum of a payload size of the CG UCI and a payload size of the HARQ-ACK information belongs.

When the sum belongs to the first range, a value corresponding to the first index may be determined to be the beta offset value. When the sum belongs to the second range, a value corresponding to the second index may be determined to be the beta offset value. When the sum belongs to the third range, a value corresponding to the third index may be determined to be the beta offset value.

i) The first range may be equal to or less than 2 bits, ii) the second range may be larger than 2 bits and equal to or less than 11 bits, and iii) the third range may be larger than 11 bits.

The configuration information may be received in a higher-layer signal.

An apparatus applied to an embodiment of the present disclosure may include an autonomous driving vehicle.

The above-describe aspects of the present disclosure are merely a part of preferred embodiments of the present disclosure, and those skilled in the art will derive and understand various embodiments reflecting technical features of the present disclosure based on the following detailed description of the present disclosure.

Advantageous Effects

According to embodiments of the present disclosure, a signal may be efficiently transmitted and received in a wireless communication system.

According to embodiments of the present disclosure, an efficient time resource allocation method is provided in consideration of the characteristics of an unlicensed band.

According to embodiments of the present disclosure, communication performance may be increased by efficiently mapping uplink control information (UCI) and a demodulation reference signals (DMRS).

According to embodiments of the present disclosure, control information may be transmitted efficiently on a physical uplink shared channel (PUSCH).

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure, illustrate embodiments of the disclosure and together with the description serve to explain the principle of the disclosure.

In the drawings:

FIG. 9 illustrates a wireless communication system supporting an unlicensed band;

FIGS. 11 to 15 illustrate exemplary resource allocations for UL transmission according to an embodiment of the present disclosure;

BEST MODE

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). $3^{rd}$ generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

As more and more communication devices require larger communication capacities, the need for enhanced mobile broadband communication relative to the legacy radio access technologies (RATs) has emerged. Massive machine type communication (MTC) providing various services to inter-connected multiple devices and things at any time in any place is one of significant issues to be addressed for next-generation communication. A communication system design in which services sensitive to reliability and latency are considered is under discussion as well. As such, the introduction of the next-generation radio access technology (RAT) for enhanced mobile broadband communication (eMBB), massive MTC (mMTC), and ultra-reliable and low latency communication (URLLC) is being discussed. For convenience, this technology is called NR or New RAT in the present disclosure.

While the following description is given in the context of a 3GPP communication system (e.g., NR) for clarity, the technical spirit of the present disclosure is not limited to the 3GPP communication system. For the background art, terms, and abbreviations used in the present disclosure, refer to the technical specifications published before the present disclosure (e.g., 38.211, 38.212, 38.213, 38.214, 38.300, 38.331, and so on).

In a wireless access system, a user equipment (UE) receives information from a base station (BS) on DL and transmits information to the BS on UL. The information transmitted and received between the UE and the BS includes general data and various types of control information. There are many physical channels according to the types/usages of information transmitted and received between the BS and the UE.

Figure 1:
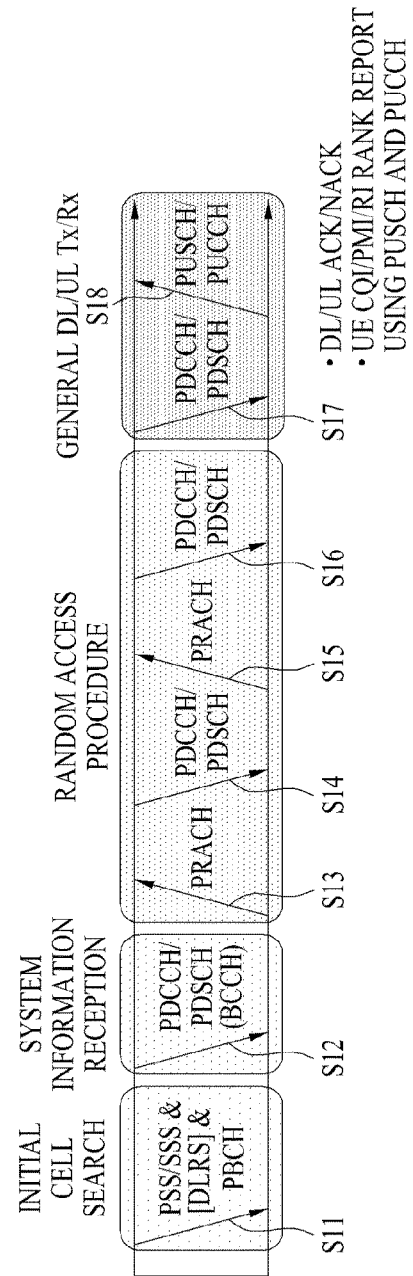
FIG. 1 illustrates physical channels and a general signal transmission method using the physical channels in a $3^{rd}$ generation partnership project (3GPP) system as an exemplary wireless communication system.

FIG. 1 illustrates physical channels and a general signal transmission method using the physical channels in a 3GPP system.

When a UE is powered on or enters a new cell, the UE performs initial cell search (S11). The initial cell search involves acquisition of synchronization to a BS. For this purpose, the UE receives a synchronization signal block (SSB) from the BS. The SSB includes a primary synchronization signal (PSS), a secondary synchronization signal (SSS), and a physical broadcast channel (PBCH). The UE synchronizes its timing to the BS and acquires information such as a cell identifier (ID) based on the PSS/SSS. Further, the UE may acquire information broadcast in the cell by receiving the PBCH from the BS. During the initial cell search, the UE may also monitor a DL channel state by receiving a downlink reference signal (DL RS).

After the initial cell search, the UE may acquire more detailed system information by receiving a physical downlink control channel (PDCCH) and a physical downlink shared channel (PDSCH) corresponding to the PDCCH (S12).

Subsequently, to complete connection to the BS, the UE may perform a random access procedure with the BS (S13 to S16). Specifically, the UE may transmit a preamble on a physical random access channel (PRACH) (S13) and may receive a PDCCH and a random access response (RAR) for the preamble on a PDSCH corresponding to the PDCCH (S14). The UE may then transmit a physical uplink shared channel (PUSCH) by using scheduling information in the RAR (S15), and perform a contention resolution procedure including reception of a PDCCH and a PDSCH signal corresponding to the PDCCH (S16).

When the random access procedure is performed in two steps, steps S13 and S15 may be performed as one step (in which Message A is transmitted by the UE), and steps S14 and S16 may be performed as one step (in which Message B is transmitted by the BS).

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure. Control information that the UE transmits to the BS is generically called uplink control information (UCI). The UCI includes a hybrid automatic repeat and request acknowledgement/negative acknowledgement (HARQ-ACK/NACK), a scheduling request (SR), channel state information (CSI), and so on. The CSI includes a channel quality indicator (CQI), a precoding matrix index (PMI), a rank indication (RI), and so on. In general, UCI is transmitted on a PUCCH. However, if control information and data should be transmitted simultaneously, the control information and the data may be transmitted on a PUSCH. In addition, the UE may transmit the UCI aperiodically on the PUSCH, upon receipt of a request/command from a network.

The UE may perform a network access procedure to perform the described/proposed procedures and/or methods (FIGS. 11 to 18). For example, the UE may receive and store system information and configuration information required to perform the above-described/proposed procedures and/or methods during network (e.g., BS) access. The configuration information required for the present disclosure may be received by higher-layer signaling (e.g., radio resource control (RRC) signaling, medium access control (MAC) signaling, or the like).

Figure 2:
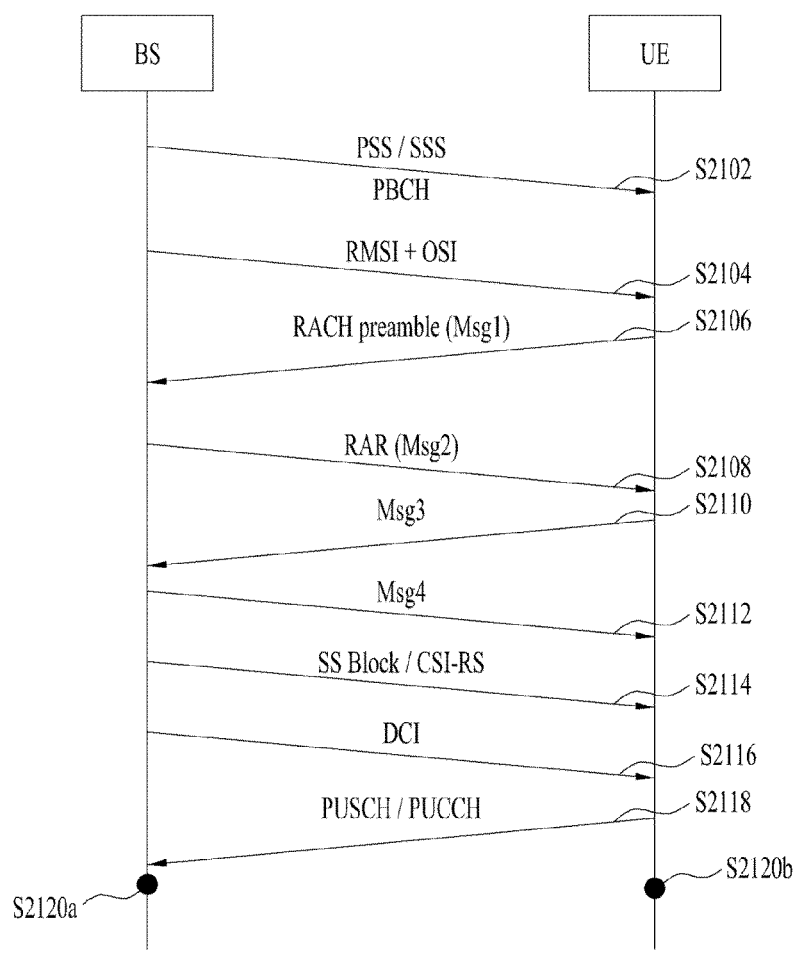
FIG. 2 illustrates network initial access and a subsequent communication process.

FIG. 2 is a diagram illustrating a signal flow for network initial access and a subsequent communication process. In NR, a physical channel and an RS may be transmitted by beamforming. When beamforming-based signal transmission is supported, a beam management process may be performed to align beams between a BS and a UE. Further, a signal proposed in the present disclosure may be transmitted/received by beamforming. In RRC_IDLE mode, beam alignment may be performed based on an SSB, whereas in RRC_CONNECTED mode, beam alignment may be performed based on a channel state information reference signal (CSI-RS) (in DL) and a sounding reference signal (SRS) (in UL). When beamforming-based signal transmission is not supported, a beam-related operation may be skipped in the following description.

Referring to FIG. 2, a BS may periodically transmit an SSB (S2102). The SSB includes a PSS/SSS/PBCH. The SSB may be transmitted by beam sweeping. Subsequently, the BS may transmit remaining minimum system information (RMSI) and other system information (OSI) (S2104). The RMSI may include information (e.g., PRACH configuration information) required for a UE to initially access the BS. After SSB detection, the UE identifies a best SSB. The UE may then transmit an RACH preamble (Message 1 (Msg 1)) to the BS in PRACH resources linked/corresponding to the index (i.e., beam) of the best SSB (S2106). The beam direction of the RACH preamble is associated with the PRACH resources. The association between the PRACH resources (and/or RACH preamble) and the SSB (index) may be configured by system information (e.g., RMSI). Subsequently, as a part of the RACH process, the BS may transmit an RAR (Msg 2) in response to the RACH preamble (S2108), and the UE may transmit Msg 3 (e.g., RRC Connection Request) using a UL grant in the RAR (S2110). The BS may transmit a contention resolution message (Msg 4) (S2112). Msg 4 may include an RRC Connection Setup message. Msg 1 and Msg 3 may be combined (e.g., into Msg A) and transmitted in one step, and Msg 2 and Msg 4 may be combined (e.g., into Msg B) and transmitted in one step.

When an RRC connection is established between the BS and the UE through the RACH process, subsequent beam alignment may be performed based on an SSB/CSI-RS (in DL) and an SRS (in UL). For example, the UE may receive the SSB/CSI-RS (S2114). The UE may use the SSB/CSI-RS to generate a beam/CSI report. The BS may request a beam/CSI report to the UE by downlink control information (DCI) (S2116). In this case, the UE may generate a beam/CSI report based on the SSB/CSI-RS, and transmit the generated beam/CSI report to the BS on a PUSCH/PUCCH (S2118). The beam/CSI report may include a beam measurement result, preferred beam information, and the like. The BS and the UE may switch beams based on the beam/CSI report (S2120a and S2120b).

Subsequently, the UE and the BS may perform the later-described/proposed procedures and/or methods (FIGS. 11 to 18). For example, the UE and the BS may process information stored in memories and transmit a wireless signal or process a received wireless signal and store the processed wireless signal in the memories, according to a proposal in the present disclosure based on configuration information obtained during the network access procedure (e.g., the system information acquisition process, the RRC connection process through an RACH, and so on). The wireless signal may include at least one of a PDCCH, a PDSCH, or an RS on DL, and at least one of a PUCCH, a PUSCH, or an SRS on UL.

Figure 3:
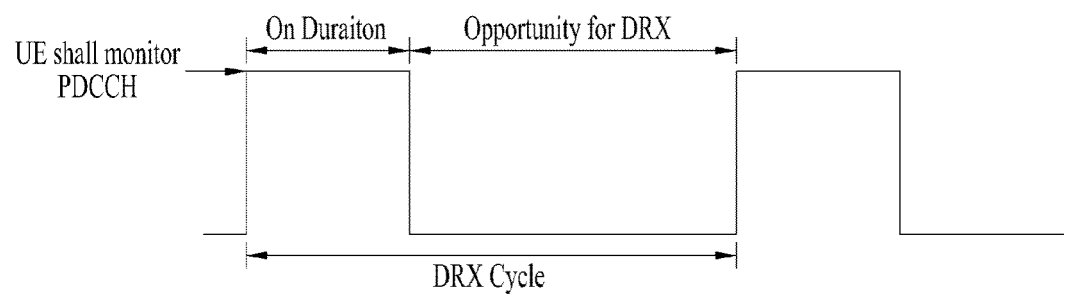
FIG. 3 illustrates a discontinuous reception (DRX) cycle.

FIG. 3 is a diagram illustrating a DRX cycle (RRC_CONNECTED state).

Referring to FIG. 3, the DRX cycle includes On Duration and Opportunity for DRX. The DRX cycle defines a time interval in which On Duration is periodically repeated. On Duration is a time period during which the UE monitors to receive a PDCCH. When DRX is configured, the UE performs PDCCH monitoring during the On Duration. When there is any successfully detected PDCCH during the PDCCH monitoring, the UE operates an inactivity timer and is maintained in an awake state. On the other hand, when there is no successfully detected PDCCH during the PDCCH monitoring, the UE enters a sleep state, when the On Duration ends. Therefore, if DRX is configured, PDCCH monitoring/reception may be performed discontinuously in the time domain, when the afore-described/proposed procedures and/or methods are performed. For example, if DRX is configured, PDCCH reception occasions (e.g., slots having PDCCH search spaces) may be configured discontinuously according to a DRX configuration in the present disclosure. On the contrary, if DRX is not configured, PDCCH monitoring/reception may be performed continuously in the time domain, when the afore-described/proposed procedures and/or methods are performed. For example, if DRX is not configured, PDCCH reception occasions (e.g., slots having PDCCH search spaces) may be configured continuously in the present disclosure. PDCCH monitoring may be limited in a time period configured as a measurement gap, irrespective of whether DRX is configured.

Table 1 describes a UE operation related to DRX (in the RRC_CONNECTED state). Referring to Table 1, DRX configuration information is received by higher-layer (RRC) signaling, and DRX ON/OFF is controlled by a DRX command of the MAC layer. Once DRX is configured, the UE may perform PDCCH monitoring discontinuously in performing the described/proposed procedures and/or methods according to the present disclosure, as illustrated in FIG. 3.

TABLE 1

|  | Type of signals | UE procedure |
|---|---|---|
| 1st step | RRC signalling (MAC-CellGroupConfig) | Receive DRX configuration information |
| 2nd Step | MAC CE ((Long) DRX command MAC CE) | Receive DRX command |
| 3rd Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

- Value of drx-OnDurationTimer: defines the length of the starting duration of a DRX cycle.
- Value of drx-InactivityTimer: defines the length of a time duration in which the UE is in the awake state after a PDCCH occasion in which a PDCCH indicating initial UL or DL data has been detected.
- Value of drx-HARQ-RTT-TimerDL: defines the length of a maximum time duration from reception of a DL initial transmission to reception of a DL retransmission.
- Value of drx-HARQ-RTT-TimerDL: defines the length of a maximum time duration from reception of a grant for a DL initial transmission to reception of a grant for a UL retransmission.
- drx-LongCycleStartOffset: defines the time duration and starting time of a DRX cycle.
- drx-ShortCycle (optional): defines the time duration of a short DRX cycle.

When at least one of drx-OnDurationTimer, drx-InactivityTimer, drx-HARQ-RTT-TimerDL, or drx-HARQ-RTT-TimerDL is running, the UE performs PDCCH monitoring in each PDCCH occasion, while staying in the awake state.

For example, according to an embodiment of the present disclosure, when DRX is configured for a UE of the present disclosure, the UE may receive a DL signal during On Duration.

Figure 4:
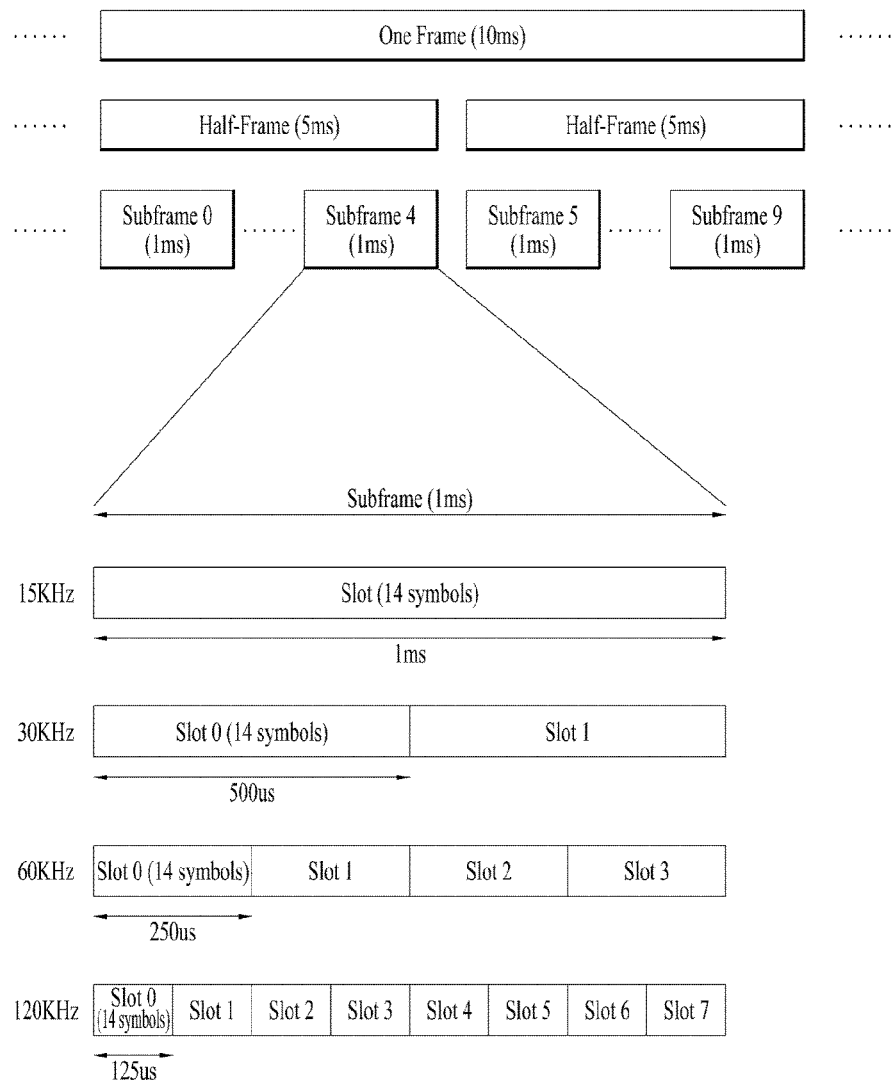
FIG. 4 illustrates a radio frame structure.

FIG. 4 illustrates a radio frame structure.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 2 exemplarily illustrates that the number of symbols per slot, the number of slots per frame, and the number of slots per subframe vary according to SCSs in a normal CP case.

TABLE 2

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: number of symbols in a slot
*$N^{frame, u}_{slot}$: number of slots in a frame
*$N^{subframe, u}_{slot}$: number of slots in a subframe Table 3 illustrates that the number of symbols per slot, the number of slots per frame, and the number of slots per subframe vary according to SCSs in an extended CP case.

TABLE 3

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

The frame structure is merely an example, and the number of subframes, the number of slots, and the number of symbols in a frame may be changed in various manners.

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

In NR, various numerologies (or SCSs) may be supported to support various 5$^{th}$ generation (5G) services. For example, with an SCS of 15 kHz, a wide area in traditional cellular bands may be supported, while with an SCS of 30 kHz or 60 kHz, a dense urban area, a lower latency, and a wide carrier bandwidth may be supported. With an SCS of 60 kHz or higher, a bandwidth larger than 24.25 kHz may be supported to overcome phase noise.

An NR frequency band may be defined by two types of frequency ranges, FR1 and FR2. FR1 and FR2 may be configured as described in Table 4 below. FR2 may be millimeter wave (mmW).

TABLE 4

| Frequency Range designation | Corresponding frequency range | Subcarrier Spacing (SCS) |
|---|---|---|
| FR1 | 450 MHz-7125 MHz | 15, 30, 60 kHz |
| FR2 | 24250 MHz-52600 MHz | 60, 120, 240 kHz |

Figure 5:
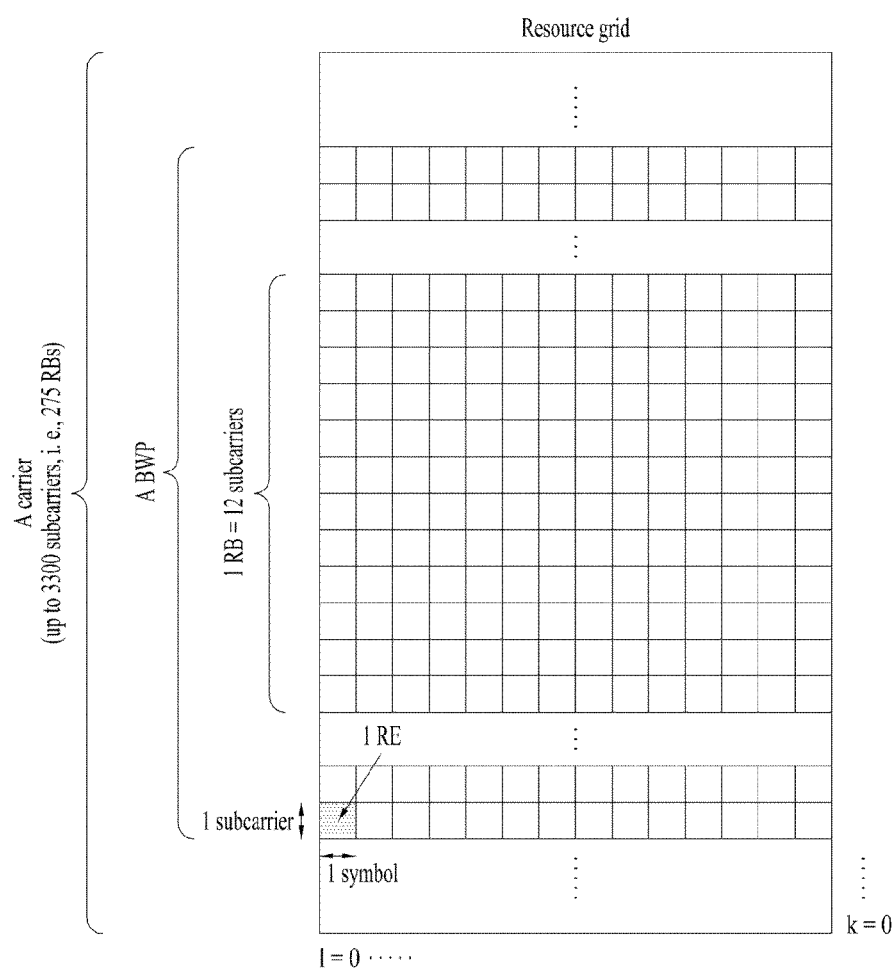
FIG. 5 illustrates a resource grid during the duration of a slot.

FIG. 5 illustrates a resource grid during the duration of one slot.

A slot includes a plurality of symbols in the time domain For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Figure 6:
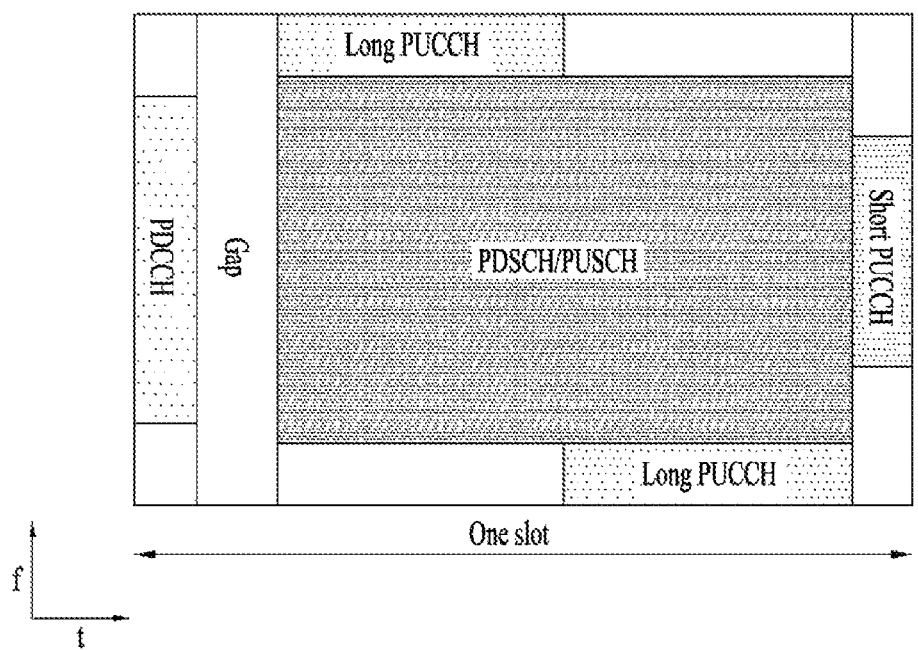
FIG. 6 illustrates exemplary mapping of physical channels in a slot.

FIG. 6 illustrates exemplary mapping of physical channels in a slot.

A DL control channel, DL or UL data, and a UL control channel may all be included in one slot. For example, the first N symbols (hereinafter, referred to as a DL control region) in a slot may be used to transmit a DL control channel, and the last M symbols (hereinafter, referred to as a UL control region) in the slot may be used to transmit a UL control channel. N and M are integers equal to or greater than 0. A resource region (hereinafter, referred to as a data region) between the DL control region and the UL control region may be used for DL data transmission or UL data transmission. A time gap for DL-to-UL or UL-to-DL switching may be defined between a control region and the data region. A PDCCH may be transmitted in the DL control region, and a PDSCH may be transmitted in the DL data region. Some symbols at the time of switching from DL to UL in a slot may be configured as the time gap.

Now, a detailed description will be given of physical channels.

The PDSCH delivers DL data (e.g., a downlink shared channel (DL-SCH) transport block (TB)) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a DMRS to resources, and transmitted through a corresponding antenna port.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH uses a fixed modulation scheme (e.g., QPSK). One PDCCH includes 1, 2, 4, 8, or 16 control channel elements (CCEs) according to its aggregation level (AL). One CCE includes 6 resource element groups (REGs), each REG being defined by one OFDM symbol by one (P)RB.

The PDCCH is transmitted in a control resource set (CORESET). The CORESET corresponds to a set of physical resources/parameters used to deliver the PDCCH/DCI in a BWP. For example, the CORESET is defined as a set of REGs with a given numerology (e.g., an SCS, a CP length, or the like). The CORESET may be configured by system information (e.g., a master information block (MIB)) or UE-specific higher-layer signaling (e.g., RRC signaling). For example, the following parameters/information may be used to configure a CORESET, and a plurality of CORESETs may overlap with each other in the time/frequency domain.

controlResourceSetId: indicates the ID of a CORESET.

frequencyDomainResources: indicates the frequency area resources of the CORESET. The frequency area resources are indicated by a bitmap, and each bit of the bitmap corresponds to an RB group (i.e., six consecutive RBs). For example, the most significant bit (MSB) of the bitmap corresponds to the first RB group of a BWP. An RB group corresponding to a bit set to 1 is allocated as frequency area resources of the CORESET.

duration: indicates the time area resources of the CORESET. It indicates the number of consecutive OFDMA symbols in the CORESET. For example, the duration is set to one of 1 to 3.

cce-REG-MappingType: indicates a CCE-to-REG mapping type. An interleaved type and a non-interleaved type are supported.

precoderGranularity: indicates a precoder granularity in the frequency domain.

tci-StatesPDCCH: provides information indicating a transmission configuration indication (TCI) state for the PDCCH (e.g., TCI-StateID). The TCI state is used to provide the quasi-co-location relation between DL RS(s) in an RS set (TCI-state) and PDCCH DMRS ports.

tci-PresentInDCI: indicates whether a TCI field is included in DCI.

pdcch-DMRS-ScramblingID: provides information used for initialization of a PDCCH DMRS scrambling sequence.

To receive the PDCCH, the UE may monitor (e.g., blind-decode) a set of PDCCH candidates in the CORESET. The PDCCH candidates are CCE(s) that the UE monitors for PDCCH reception/detection. The PDCCH monitoring may be performed in one or more CORESETs in an active DL BWP on each active cell configured with PDCCH monitoring. A set of PDCCH candidates monitored by the UE is defined as a PDCCH search space (SS) set. The SS set may be a common search space (CSS) set or a UE-specific search space (USS) set.

Table 5 lists exemplary PDCCH SSs.

TABLE 5

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg 2, Msg 4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| UE Specific | UE Specific | C-RNTI, or MCS-C-RNTI, or CS-RNTI(s) | User specific PDSCH decoding |

The SS set may be configured by system information (e.g., MIB) or UE-specific higher-layer (e.g., RRC) signaling. S or fewer SS sets may be configured in each DL BWP of a serving cell. For example, the following parameters/information may be provided for each SS set. Each SS set may be associated with one CORESET, and each CORESET configuration may be associated with one or more SS sets.

searchSpaceId: indicates the ID of the SS set.

controlResourceSetId: indicates a CORESET associated with the SS set.

monitoringSlotPeriodicityAndOffset: indicates a PDCCH monitoring periodicity (in slots) and a PDCCH monitoring offset (in slots).

monitoringSymbolsWithinSlot: indicates the first OFDMA symbol(s) for PDCCH monitoring in a slot configured with PDCCH monitoring. The OFDMA symbols are indicated by a bitmap and each bit of the bitmap corresponds to one OFDM symbol in the slot. The MSB of the bitmap corresponds to the first OFDM symbol of the slot. OFDMA symbol(s) corresponding to bit(s) set to 1 corresponds to the first symbol(s) of the CORESET in the slot.

nrofCandidates: indicates the number of PDCCH candidates (e.g., one of 0, 1, 2, 3, 4, 5, 6, and 8) for each AL={1, 2, 4, 8, 16}.

searchSpaceType: indicates whether the SS type is CSS or USS.

DCI format: indicates the DCI format of PDCCH candidates.

The UE may monitor PDCCH candidates in one or more SS sets in a slot based on a CORESET/SS set configuration. An occasion (e.g., time/frequency resources) in which the PDCCH candidates should be monitored is defined as a PDCCH (monitoring) occasion. One or more PDCCH (monitoring) occasions may be configured in a slot.

Table 6 illustrates exemplary DCI formats transmitted on the PDCCH.

TABLE 6

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |

TABLE 6-continued

| DCI format | Usage |
| --- | --- |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

The PUCCH delivers uplink control information (UCI). The UCI includes the following information.

SR: information used to request UL-SCH resources.

HARQ-ACK: a response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term HARQ-ACK is interchangeably used with HARQ ACK/NACK and ACK/NACK.

CSI: feedback information for a DL channel. Multiple input multiple output (MIMO)-related feedback information includes an RI and a PMI.

Table 7 illustrates exemplary PUCCH formats. PUCCH formats may be divided into short PUCCHs (Formats 0 and 2) and long PUCCHs (Formats 1, 3, and 4) based on PUCCH transmission durations.

TABLE 7

| PUCCH format | Length in OFDM symbols $N_{symb}^{PUCCI}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration.

PUCCH format 1 conveys UCI of up to 2 bits and modulation symbols of the UCI are spread with an orthogonal cover code (OCC) (which is configured differently whether frequency hopping is performed) in the time domain The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or Layer 1 (L1) signaling such as a PDCCH) (configured scheduling or configured grant). The PUSCH transmission may be performed in a codebook-based or non-codebook-based manner.

On DL, the BS may dynamically allocate resources for DL transmission to the UE by PDCCH(s) (including DCI format 1_0 or DCI format 1_1). Further, the BS may indicate to a specific UE that some of resources pre-scheduled for the UE have been pre-empted for signal transmission to another UE, by PDCCH(s) (including DCI format 2_1). Further, the BS may configure a DL assignment periodicity by higher-layer signaling and signal activation/deactivation of a configured DL assignment by a PDCCH in a semi-persistent scheduling (SPS) scheme, to provide a DL assignment for an initial HARQ transmission to the UE. When a retransmission for the initial HARQ transmission is required, the BS explicitly schedules retransmission resources through a PDCCH. When a DCI-based DL assignment collides with an SPS-based DL assignment, the UE may give priority to the DCI-based DL assignment.

Similarly to DL, for UL, the BS may dynamically allocate resources for UL transmission to the UE by PDCCH(s) (including DCI format 0_0 or DCI format 0_1). Further, the BS may allocate UL resources for initial HARQ transmission to the UE based on a configured grant (CG) method (similarly to SPS). Although dynamic scheduling involves a PDCCH for a PUSCH transmission, a configured grant does not involve a PDCCH for a PUSCH transmission. However, UL resources for retransmission are explicitly allocated by PDCCH(s). As such, an operation of preconfiguring UL resources without a dynamic grant (DG) (e.g., a UL grant through scheduling DCI) by the BS is referred to as a "CG". Two types are defined for the CG.

Type 1: a UL grant with a predetermined periodicity is provided by higher-layer signaling (without L1 signaling).

Type 2: the periodicity of a UL grant is configured by higher-layer signaling, and activation/deactivation of the CG is signaled by a PDCCH, to provide the UL grant.

Figure 7:
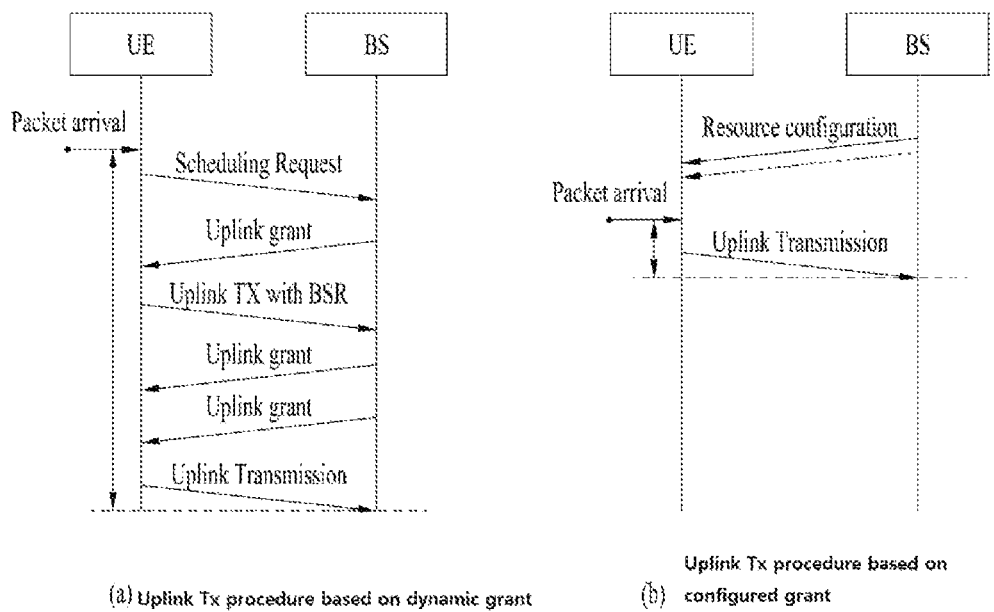
FIG. 7 illustrates exemplary uplink (UL) transmission operations of a user equipment (UE)

FIG. 7 illustrates exemplary UL transmission operations of a UE. The UE may transmit an intended packet based on a DG (FIG. 7(a)) or based on a CG (FIG. 7(b)).

Resources for CGs may be shared between a plurality of UEs. A UL signal transmission based on a CG from each UE may be identified by time/frequency resources and an RS parameter (e.g., a different cyclic shift or the like). Therefore, when a UE fails in transmitting a UL signal due to signal collision, the BS may identify the UE and explicitly transmit a retransmission grant for a corresponding TB to the UE.

K repeated transmissions including an initial transmission are supported for the same TB by a CG. The same HARQ process ID is determined for K times repeated UL signals based on resources for the initial transmission. The redundancy versions (RVs) of a K times repeated TB have one of the patterns {0, 2, 3, 1}, {0, 3, 0, 3}, and {0, 0, 0, 0}.

Figure 8:
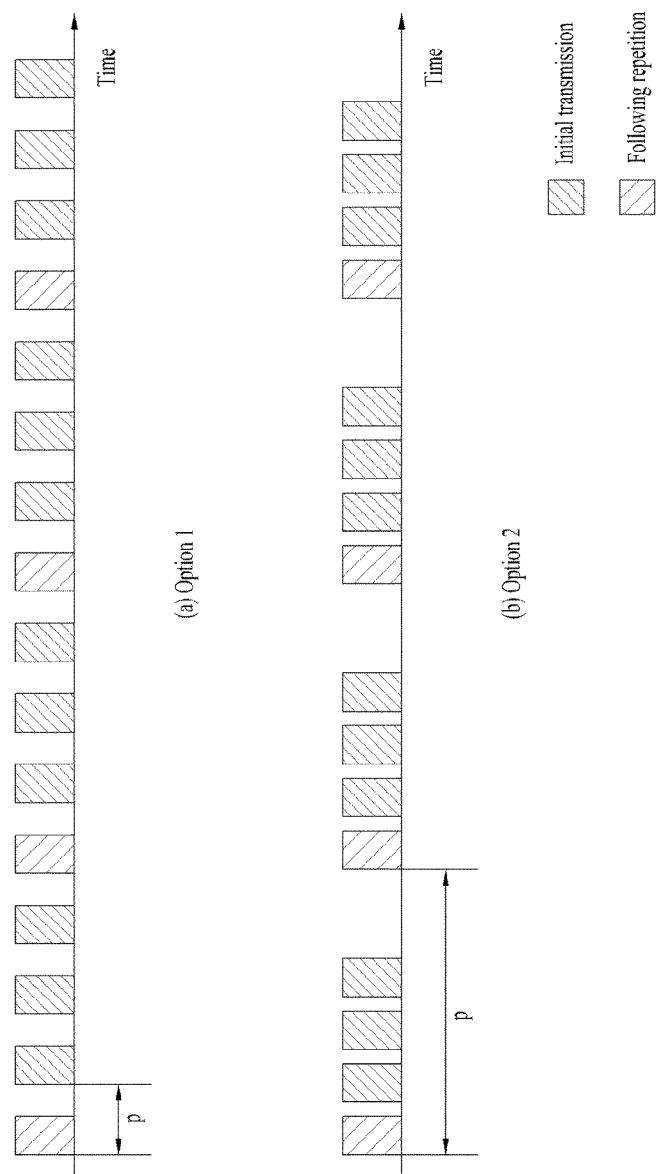
FIG. 8 illustrates exemplary repeated transmissions based on a configured grant.

FIG. 8 illustrates exemplary repeated transmissions based on a CG.

The UE performs repeated transmissions until one of the following conditions is satisfied:

A UL grant for the same TB is successfully received;
The repetition number of the TB reaches K; and
(In Option 2) the ending time of a period P is reached.

When there are UL/DL transmission data for multiple UEs in a wireless communication system, the BS selects a UE for data transmission in each TTI (e.g., slot). In a multi-carrier system and a similar system, the BS selects UEs for UL/DL data transmission and also selects frequency bands to be used for the data transmission for the UEs.

From the perspective of UL, the UEs transmit RSs (or pilots) on UL. The BS then determines the channel states of the UEs based on the RSs received from the UEs and selects UEs for UL data transmission in respective unit frequency bands in each TTI. The BS indicates these results to the UEs. That is, the BS transmits a UL assignment message requesting data transmission in a specific frequency band to a UE which has been scheduled for UL transmission in a specific TTI. The UL assignment message is also called a UL grant. The UE transmits data on UL according to the UL assignment message. The UL assignment message may include a UE ID, RB allocation information, a modulation and coding scheme (MCS), an RV, a new data indication (NDI), and so on.

In synchronous HARQ, a retransmission timing is pre-agreed at a system level (e.g., 4 subframes after a NACK reception time). Accordingly, the BS transmits a UL grant message to the UE only at an initial transmission, and subsequent retransmissions are performed based on an ACK/NACK signal (e.g., PHICH signal). In asynchronous HARQ, a retransmission timing is not agreed between the BS and the UE, and thus the BS should transmit a retransmission request message to the UE. Further, in non-adaptive HARQ, the same frequency resources and the same MCS may be used for a previous transmission and a retransmission, whereas in adaptive HARQ, different frequency resources and different MCSs may be used for a previous transmission and a retransmission. In asynchronous adaptive HARQ, for example, retransmission frequency resources or a retransmission MCS is changed at each transmission time. Therefore, a retransmission request message may include a UE ID, RB allocation information, an HARQ process ID/number, an RV, and NDI information.

In NR, a dynamic HARQ-ACK codebook scheme and semi-static HARQ-ACK codebook scheme are supported. The term HARQ-ACK (or A/N) codebook may be replaced with HARQ-ACK payload.

When the dynamic HARQ-ACK codebook scheme is configured, the size of A/N payload varies according to the amount of actually scheduled DL data. For this purpose, a PDCCH related to DL scheduling includes a counter-downlink assignment index (DAI) and a total-DAI. The counter-DAI indicates a {CC, slot} scheduling order calculated in a component carrier (CC) (or cell)-first manner and is used to indicate the position of an A/N bit in an A/N codebook. The total-DAI indicates a slot-level scheduling accumulative value up to the current slot and is used to determine the size of the A/N codebook.

When the semi-static HARQ-ACK codebook scheme is configured, the size of an A/N codebook is fixed (to a maximum value) irrespective of the amount of actually scheduled DL data. Specifically, (a maximum) A/N payload (size) transmitted on one PUCCH in one slot may be determined to be the number of A/N bits corresponding to combinations (hereinafter, referred to as a bundling window) of all CCs configured for the UE and DL scheduling slots (or PDSCH transmission slots to PDCCH monitoring slots) available as the A/N transmission timing. For example, DL grant DCI (PDCCH) may include PDSCH-to-A/N timing information, and the PDSCH-to-A/N timing information may have one (e.g., k) of a plurality of values. For example, when a PDSCH is received in slot #m and PDSCH-to-A/N timing information in DL grant DCI (PDCCH) that schedules the PDSCH indicates k, A/N information for the PDSCH may be transmitted in slot #(m+k). For example, k∈{1, 2, 3, 4, 5, 6, 7, 8}. When A/N information is transmitted in slot #n, the A/N information may include as many A/Ns as possible based on a bundling window. That is, the A/N information in slot #n may include an A/N corresponding to slot #(n−k). For example, when k∈{1, 2, 3, 4, 5, 6, 7, 8}, the A/N information in slot #n includes A/Ns (i.e., a maximum number of A/Ns) corresponding to slot #(n−8) to slot #(n−1) irrespective of actual DL data reception. A/N information may be replaced with A/N codebook or A/N payload. Further, a slot may be understood as/replaced with a candidate occasion for DL data reception. As in the example, the bundling window may be determined based on a PDSCH-to-A/N timing based on an A/N slot, and a PDSCH-to-A/N timing set may have predefined values (e.g., {1, 2, 3, 4, 5, 6, 7, 8}) or may be configured by higher-layer (RRC) signaling.

Similarly to licensed-assisted access (LAA) in the legacy 3GPP LTE system, use of an unlicensed band for cellular communication is also under consideration in a 3GPP NR system. Unlike LAA, a stand-along (SA) operation is aimed in an NR cell of an unlicensed band (hereinafter, referred to as NR unlicensed cell (UCell)). For example, PUCCH, PUSCH, and PRACH transmissions may be supported in the NR UCell.

In an NR system to which various embodiments of the present disclosure are applicable, up to 400 MHz per component carrier (CC) may be allocated/supported. When a UE operating in such a wideband CC always operates with a radio frequency (RF) module turned on for the entire CC, battery consumption of the UE may increase.

Alternatively, considering various use cases (e.g., eMBB, URLLC, mMTC, and so on) operating within a single wideband CC, a different numerology (e.g., SCS) may be supported for each frequency band within the CC.

Alternatively, each UE may have a different maximum bandwidth capability.

In this regard, the BS may indicate to the UE to operate only in a partial bandwidth instead of the total bandwidth of the wideband CC. The partial bandwidth may be defined as a bandwidth part (BWP).

A BWP may be a subset of contiguous RBs on the frequency axis. One BWP may correspond to one numerology (e.g., SCS, CP length, slot/mini-slot duration, and so on).

The BS may configure multiple BWPs in one CC configured for the UE. For example, the BS may configure a BWP occupying a relatively small frequency area in a PDCCH monitoring slot, and schedule a PDSCH indicated (or scheduled) by a PDCCH in a larger BWP. Alternatively, when UEs are concentrated on a specific BWP, the BS may configure another BWP for some of the UEs, for load balancing. Alternatively, the BS may exclude some spectrum of the total bandwidth and configure both-side BWPs of the cell in the same slot in consideration of frequency-domain inter-cell interference cancellation between neighboring cells.

The BS may configure at least one DL/UL BWP for a UE associated with the wideband CC, activate at least one of DL/UL BWP(s) configured at a specific time point (by L1 signaling (e.g., DCI), MAC signaling, or RRC signaling), and indicate switching to another configured DL/UL BWP (by L1 signaling, MAC signaling, or RRC signaling). Further, upon expiration of a timer value (e.g., a BWP inactivity timer value), the UE may switch to a predetermined DL/UL BWP. The activated DL/UL BWP may be referred to as an active DL/UL BWP. During initial access or before an RRC connection setup, the UE may not receive a configuration for a DL/UL BWP from the BS. A DL/UL BWP that the UE assumes in this situation is defined as an initial active DL/UL BWP.

FIG. 9 illustrates an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When a BS and a UE transmit and receive signals on carrier-aggregated LCC and UCC as illustrated in FIG. 9(a), the LCC and the UCC may be configured as a primary CC (PCC) and a secondary CC (SCC), respectively. The BS and the UE may transmit and receive signals on one UCC or on a plurality of carrier-aggregated UCCs as illustrated in FIG. 9(b). In other words, the BS and UE may transmit and receive signals only on UCC(s) without using any LCC. For an SA operation, PRACH, PUCCH, PUSCH, and SRS transmissions may be supported on a UCell.

Signal transmission and reception operations in an unlicensed band as described in the present disclosure may be applied to the afore-mentioned deployment scenarios (unless specified otherwise).

Unless otherwise noted, the definitions below are applicable to the following terminologies used in the present disclosure.

Channel: a carrier or a part of a carrier composed of a contiguous set of RBs in which a channel access procedure (CAP) is performed in a shared spectrum.

Channel access procedure (CAP): a procedure of assessing channel availability based on sensing before signal transmission in order to determine whether other communication node(s) are using a channel. A basic sensing unit is a sensing slot with a duration of $T_{sl}=9$ us. The BS or the UE senses the slot during a sensing slot duration. When power detected for at least 4 us within the sensing slot duration is less than an energy detection threshold $X_{thresh}$, the sensing slot duration To is be considered to be idle. Otherwise, the sensing slot duration $T_{sl}$ is be considered to be busy. CAP may also be called listen before talk (LBT).

Channel occupancy: transmission(s) on channel(s) from the BS/UE after a CAP.

Channel occupancy time (COT): a total time during which the BS/UE and any BS/UE(s) sharing channel occupancy performs transmission(s) on a channel after a CAP. Regarding COT determination, if a transmission gap is less than or equal to 25 us, the gap duration may be counted in a COT. The COT may be shared for transmission between the BS and corresponding UE(s).

DL transmission burst: a set of transmissions without any gap greater than 16 us from the BS. Transmissions from the BS, which are separated by a gap exceeding 16 us are considered as separate DL transmission bursts. The BS may perform transmission(s) after a gap without sensing channel availability within a DL transmission burst.

UL transmission burst: a set of transmissions without any gap greater than 16 us from the UE. Transmissions from the UE, which are separated by a gap exceeding 16 us are considered as separate UL transmission bursts. The UE may perform transmission(s) after a gap without sensing channel availability within a DL transmission burst.

Discovery burst: a DL transmission burst including a set of signal(s) and/or channel(s) confined within a window and associated with a duty cycle. The discovery burst may include transmission(s) initiated by the BS, which includes a PSS, an SSS, and a cell-specific RS (CRS) and further includes a non-zero power CSI-RS. In the NR system, the discover burst includes may include transmission(s) initiated by the BS, which includes at least an SS/PBCH block and further includes a CORESET for a PDCCH scheduling a PDSCH carrying SIB1, the PDSCH carrying SIB1, and/or a non-zero power CSI-RS.

Figure 10:
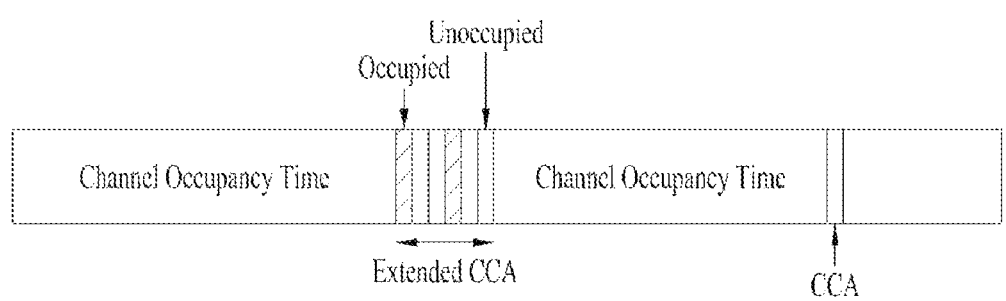
FIG. 10 illustrates an exemplary method of occupying resources in an unlicensed band.

FIG. 10 illustrates an exemplary method of occupying resources in an unlicensed band.

Referring to FIG. 10, a communication node (e.g., a BS or a UE) operating in an unlicensed band should determine whether other communication node(s) is using a channel, before signal transmission. For this purpose, the communication node may perform a CAP to access channel(s) on which transmission(s) is to be performed in the unlicensed band. The CAP may be performed based on sensing. For example, the communication node may determine whether other communication node(s) is transmitting a signal on the channel(s) by carrier sensing (CS) before signal transmission. Determining that other communication node(s) is not transmitting a signal is defined as confirmation of clear channel assessment (CCA). In the presence of a CCA threshold (e.g., $X_{thresh}$) which has been predefined or configured by higher-layer (e.g., RRC) signaling, the communication node may determine that the channel is busy, when detecting energy higher than the CCA threshold in the channel. Otherwise, the communication node may determine that the channel is idle. When determining that the channel is idle, the communication node may start to transmit a signal in the unlicensed band. CAP may be replaced with LBT.

Table 8 describes an exemplary CAP supported in NR-U.

TABLE 8

| | Type | Explanation |
|---|---|---|
| DL | Type 1 CAP | CAP with random back-off time duration spanned by the sensing slots that are sensed to be idle before a downlink transmission(s) is random |
| | Type 2 CAP Type 2A, 2B, 2C | CAP without random back-off time duration spanned by sensing slots that are sensed to be idle before a downlink transmission(s) is deterministic |
| UL | Type 1 CAP | CAP with random back-off time duration spanned by the sensing slots that are sensed to be idle before a downlink transmission(s) is random |
| | Type 2 CAP Type 2A, 2B, 2C | CAP without random back-off time duration spanned by sensing slots that are sensed to be idle before a downlink transmission(s) is deterministic |

In a wireless communication system supporting an unlicensed band, one cell (or carrier (e.g., CC)) or BWP configured for a UE may be a wideband having a larger bandwidth (BW) than in legacy LTE. However, a BW requiring CCA based on an independent LBT operation may be limited according to regulations. Let a subband (SB) in which LBT is individually performed be defined as an LBT-SB. Then, a plurality of LBT-SBs may be included in one wideband cell/BWP. A set of RBs included in an LBT-SB may be configured by higher-layer (e.g., RRC) signaling. Accordingly, one or more LBT-SBs may be included in one cell/BWP based on (i) the BW of the cell/BWP and (ii) RB set allocation information.

A plurality of LBT-SBs may be included in the BWP of a cell (or carrier). An LBT-SB may be, for example, a 20-MHz band. The LBT-SB may include a plurality of contiguous (P)RBs in the frequency domain, and thus may be referred to as a (P)RB set.

To allow the UE to transmit UL data in the unlicensed band, the BS should succeed in an LBT operation to transmit a UL grant in the unlicensed band, and the UE should also succeed in an LBT operation to transmit the UL data. That is, only when both of the BS and the UE succeed in their LBT operations, the UE may attempt the UL data transmission. Further, because a delay of at least 4 msec is involved between a UL grant and scheduled UL data in the LTE system, earlier access from another transmission node coexisting in the unlicensed band during the time period may defer the scheduled UL data transmission of the UE. In this context, a method of increasing the efficiency of UL data transmission in an unlicensed band is under discussion.

In LTE LAA, the BS may indicate to the UE autonomous UL (AUL) subframes or slots in which the UE is allowed to transmit UL data without receiving a UL grant by an X-bit bitmap (e.g., X=40 bits).

When auto transmission (Tx) activation is indicated to the UE, the UE may transmit UL data in subframes or slots indicated by the bitmap, without receiving a UL grant. As the BS transmits a PDCCH carrying scheduling information required for decoding, for PDSCH transmission, the UE also transmits information required for PUSCH decoding, AUL UCI to the BS, for PUSCH transmission in an AUL subframe or slot. The AUL UCI includes information required for AUL PUSCH reception, such as an HARQ ID, an NDI, an RV, an AUL subframe (SF) starting position, and an AUL SF ending position, and information required to share a UE-initiated COT with the BS. Specifically, sharing the UE-initiated COT with the BS refers to an operation of assigning a part of a channel occupied through random back-off-based category 4 LBT (or type 1 CAP) to the BS by the UE and transmitting a PDCCH (and a PDSCH) on the channel by the BS, when the channel is idle as a result of one-shot LBT of 25 usec (based on a timing gap resulting from the UE's empting the last symbol).

To support mainly a UL transmission having a relatively high reliability and a relatively low time delay, NR also supports CG type 1 and CG type 2 in which the BS preconfigures time, frequency, and code resources for the UE by higher-layer signaling (e.g., RRC signaling) or both of higher-layer signaling and L1 signaling (e.g., DCI). Without receiving a UL grant from the BS, the UE may perform a UL transmission in resources configured with type 1 or type 2. In type 1, the periodicity of a CG, an offset from SFN=0, time/frequency resource allocation, a repetition number, a DMRS parameter, an MCS/TB size (TB S), a power control parameter, and so on are all configured only by higher-layer signaling such as RRC signaling, without L1 signaling. Type 2 is a scheme of configuring the periodicity of a CG and a power control parameter by higher-layer signaling such as RRC signaling and indicating information about the remaining resources (e.g., the offset of an initial transmission timing, time/frequency resource allocation, a DMRS parameter, and an MCS/TBS) by activation DCI as L1 signaling.

AUL of LTE AAA and a CG of NR are different mainly in terms of a method of transmitting an HARQ-ACK feedback for a PUSCH that a UE has transmitted without receiving a UL grant, and the presence or absence of UCI transmitted along with the PUSCH. While an HARQ process is determined by an equation of a symbol index, a periodicity, and the number of HARQ processes in a CG of NR, explicit HARQ-ACK feedback information is transmitted in AUL downlink feedback information (AUL DFI) in LTE AAA. Further, UCI including information such as an HARQ ID, an NDI, and an RV is also transmitted in AUL UCI at each AUL PUSCH transmission in LTE AAA. In the case of a CG in NR, the BS identifies a UE by time/frequency resources and DMRS resources used for PUSCH transmission, whereas in the case of LTE AAA, the BS identifies a UE by a UE ID explicitly included in AUL UCI transmitted together with a PUSCH as well as DMRS resources.

Before a description of proposed methods, NR-based channel access schemes for an unlicensed band used in the present disclosure are classified as follows.

Category 1 (Cat-1): the next transmission immediately follows the previous transmission after a switching gap within a COT, and the switching gap is shorter than 16 us, including even a transceiver turn-around time.

Category 2 (Cat-2): an LBT method without back-off. Once a channel is confirmed to be idle during a specific time period shortly before transmission, the transmission may be performed immediately.

Category 3 (Cat-3): an LBT method with fixed contention window size (CWS)i-based back-off. A transmitting entity selects a random number N in a range of 0 to a (fixed) maximum CWS value and decrements a counter value each time it determines that a channel is idle. When the counter value reaches 0, the transmitting entity is allowed to perform a transmission.

Category 4 (Cat-4): an LBT method with variable CWS-based back-off. A transmitting entity selects a random number N in a range of 0 to a (variable) maximum CWS value and decrements a counter value, each time it determines that a channel is idle. When the counter value reaches 0, the transmitting entity is allowed to perform a transmission. If the transmitting entity receives a feedback indicating reception failure of the transmission, the transmitting entity increases the maximum CWS value by one level, selects a random number again within the increased CWS value, and performs an LBT procedure.

Now, a description will be given of methods of allocating resources for a CG UL transmission of a UE in a wireless communication system including a BS and UEs in an unlicensed band.

The proposed methods of the present disclosure may also be applied in a similar manner to a licensed (or unlicensed)-band operation without LBT, not limited to an LBT-based unlicensed-band operation. Particularly, proposed method #9 and proposed method #10 may also be applied to a licensed band.

The following description is given with the appreciation that the term band may be interchangeably used with CC/cell, and a CC/cell (index) may be replaced with a BWP (index) configured within the CC/cell, or a combination of the CC/cell (index) and the BWP (index).

Terms are defined as follows.

UCI: control information transmitted on UL by the UE. UCI includes various types of control information (i.e., UCI types). For example, the UCI may include an HARQ-ACK (simply, A/N or AN), an SR, and CSI.

PUCCH: a physical layer UL channel for UCI transmission. For convenience, PUCCH resources configured and/or indicated for A/N, SR, and CSI transmission are referred to as A/N PUCCH resources, SR PUCCH resources, and CSI PUCCH resources, respectively.

UL grant DCI: DCI for a UL grant. For example, UL grant DCI means DCI formats 0_0 and 0_1, and is transmitted on a PDCCH.

DL assignment/grant DCI: DCI for a DL grant. For example, DL assignment/grant DCI means DCI formats 1_0 and 1_1, and is transmitted on a PDCCH.

PUSCH: a physical layer UL channel for UL data transmission.

Slot: a basic time unit (TU) (or time interval) for data scheduling. A slot includes a plurality of symbols. Herein, a symbol includes an OFDM symbol (e.g., CP-OFDM symbol or DFT-s-OFDM symbol). In this specification, the terms symbol, OFDM-based symbol, OFDM symbol, CP-OFDM symbol, and DFT-s-OFDM symbol may be replaced with each other.

Channel: a carrier or a part of a carrier composed of a set of contiguous RBs in which a CAP is performed in a shared spectrum. For example, a channel may mean a frequency unit in which LBT is performed, and may be interchangeably used with an LBT-SB in the following description.

LBT for channel X: this means that LBT is performed to check whether channel X is available. For example, before a transmission starts on channel X, a CAP (e.g., see FIG. 11) may be performed.

A/N for cell A: A/N information for data (e.g., PDSCH) received in cell A.

Burst: a signal transmitted continuously on the time axis without a gap in an unlicensed band.

Configured grant UL access UCI (CUL UCI)/configured grant UCI (CG UCI): UCI transmitted on a CG PUSCH and including information such as an HARQ process ID and an RV. CG UCI may be used for CG PUSCH decoding at the BS. In the following description, CUL UCI and CG UCI may be used interchangeably.

NR UCI: UCI distinguished from CG UCI, which includes an HARQ-ACK, CSI part 1, and CSI part 2.

CUL downlink feedback information (DFI)/CG DFI: a result of decoding a CG PUSCH received from the UE, which is transmitted to the UE by the BS. For example, CUL DFI/CG DFI means a decoding result (e.g., ACK/NACK) for a specific HARQ process ID.

Figure 11:
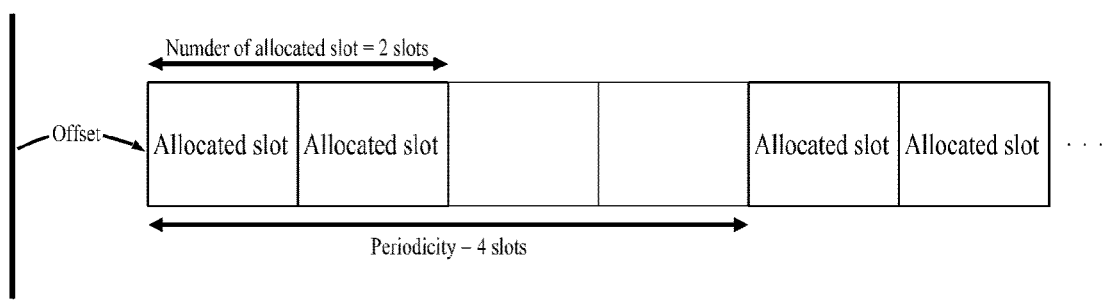

Time resource allocation for a CG UL transmission in an unlicensed band is allocated according to i) an offset from a specific reference point (e.g., SFN=0) through a higher layer signal such as RRC, or ii) a slot periodicity and the number of slots available for CUL PUSCH transmission from a time point when an activation signal is received by a physical layer signal. For example, in the case where CUL transmission slots are allocated by a higher-layer signal only or both of a higher-layer signal and a physical-layer signal, when two slots are allocated within a 4-slot period, two consecutive slots may be allocated every four slots as illustrated in FIG. 11.

For symbols to be used for the CUL PUSCH transmission in the CUL transmission slots, a starting symbol and a length may be indicated by a start and length indicator value (SLIV).

The following description is given with the appreciation that an SLIV is a specific value indicating a combination of the index of a starting symbol and the number of consecutive symbols allocated for data transmission counted from the starting symbol (the length of time resources for data transmission) in a slot or a TTI, in time-domain resource allocation for a PDSCH or a PUSCH.

In a general NR system, when an SLIV of {S, L} is indicated for a single slot, the UE may transmit or receive data in as many consecutive symbols as L from symbol #S in the slot.

In view of the nature of an unlicensed band in which LBT should precede a data transmission, scheduling of a plurality of slots may be considered in an embodiment of the present disclosure. Accordingly, a consideration should be given to how to interpret the legacy SLIV scheme of allocating time resources in a single slot, when the legacy SLIV scheme is used for time resource allocation in a plurality of slots.

In the presence of a gap equal to or longer than a predetermined length between transmissions in the unlicensed band, LBT should be performed again. Therefore, the unlicensed band may need a different time resource allocation scheme from a CG UL transmission in the licensed band. Further, in order to provide more transmission opportunities to UEs, a CUL PUSCH with a symbol period shorter than a slot period may be allocated. Just as AUL UCI is always multiplexed in an AUL PUSCH during an AUL PUSCH transmission, CUL UCI may be transmitted along with a CUL PUSCH at each CUL PUSCH transmission. Further, CUL UCI mapping methods need to be defined according to the type of mapping between allocated symbol resources and a PUSCH or whether NR UCI is piggybacked to a PUSCH.

The present disclosure proposes time resource allocation methods and CUL UCI mapping methods, in the case of slot-based scheduling or non-slot-based scheduling of a CUL PUSCH.

Each of the proposed methods described below may be applied in combination with other proposed methods, unless contradicting with each other.

[Proposed method #1] In the case where the BS has allocated CUL transmission slot(s) to the UE by an offset, a slot periodicity, and the number of allocated slots and has configured/indicated all of time/frequency/code resources required for a CUL transmission, such as a frequency/

DMRS sequence, for/to the UE, the UE interprets a starting symbol index and a transmission length L indicated by an SLIV as follows.

(1-1) The UE may perform a CUL PUSCH transmission in each CUL slot, interpreting that consecutive time resources from symbol #S in the first CUL slot to symbol #(S+L) or #L in the ending CUL symbol have been allocated.

A. However, in the case of a single slot/PUSCH transmission (i.e., only one slot is allocated within a period), Opt 1) the UE may use symbols up to symbol #(S+L) for the transmission, Opt 2) the UE may transmit the CUL PUSCH in two slots unconditionally, or Opt 3) the UE may transmit the CUL PUSCH until a slot boundary irrespective of L. Particularly, if the configured/indicated S is larger than L, Opt 2) or Opt 3) may be applied.

(1-2) When the UE fails in LBT in the first slot of the UL burst, the position of the starting symbol for transmission may be maintained to be symbol index S equally in each of the following CUL slots (the remaining allocated consecutive CUL slots except for the first slot).

(1-3) When the UE fails in LBT in the first slot of the UL burst, the position of the starting symbol for transmission may be aligned with the boundary of each of the following CUL slots (the remaining allocated consecutive CUL slots except for the first slot).

However, when the UE transmits the CUL PUSCH only in a part of the consecutive CUL slots, the BS may configure/indicate the position of the ending symbol of the last CUL slot as symbol #(S+L) or the last symbol of the last CUL slot according to symbol #S in the slot, for/to the UE. Further, the BS may configure/indicate that the UE should not use the last symbol of the last CUL slot in transmitting the CUL PUSCH by a higher-layer signal or both of a higher-layer signal and a physical-layer signal, for a specific purpose (e.g., an LBT gap for UL-to-DL COT sharing).

For UE multiplexing, the BS may configure a starting position candidate at a sub-symbol level between symbol #S and symbol #(S+1) or between symbol #(S−1) and symbol SS. The UE may then extend the CP of the starting symbol by a length equal to or less than one symbol duration with respect to the SCS of the CUL PUSCH from the time of LBT success to the next symbol boundary.

FIGS. 12(a) and 12(b) illustrate examples of the above-described (1-1) and (1-3), respectively. When the number of allocated slots is '2', the periodicity is '4', and the SLIV indicates that S=3 and L=6, CUL slots and CUL PUSCH symbols may be allocated as illustrated in FIG. 12.

In FIG. 12(a), a UE allocated to two consecutive CUL slots may interpret the SLIV as allocating consecutive symbols from symbol #3 (S=3) of the first slot to symbol #(S+L), that is, symbol #9 of the second slot, and attempt LBT in symbol #3 of the first CUL slot, for CUL PUSCH transmission. If the UE succeeds in the LBT at a position LBT #1 and uses the two allocated CUL slots for the transmission, all symbols between the two slots (i.e., the hatched symbols in FIG. 12(a)) are available for the PUSCH transmission. If the UE fails in the LBT at the position LBT #1, the UE may drop the transmission in the first slot, and attempt LBT at a position LBT #2 (in symbol #3 (S=3)) in the second slot. If the UE succeeds in the LBT at the position LBT #2, the UE may transmit the CUL PUSCH. In this method, therefore, a DMRS symbol may always be located in the same fixed position in a CUL slot according to the configured/indicated SLIV. That is, the DMRS position may be determined according to the SLIV regardless of the position of a slot among allocated consecutive CUL slots or a single-slot/multi-slot/PUSCH transmission. More specifically, a DMRS symbol may be transmitted in symbol #S or symbol #(S+1) according to a PUSCH mapping type and an extended CP transmission position. Further, if the PUSCH mapping type indicated by the SLIV is A, the DMRS may be located near symbol #S. If the PUSCH mapping type indicated by the SLIV is B, the DMRS may be located in the first symbol being a slot boundary or the second symbol according to the position of a sub-symbol-level starting-position candidate in each of the remaining slots except for the first slot.

Likewise in FIG. 12(b), the UE may interpret the SLIV as allocating consecutive symbols from symbol #3 (S=3) of the first slot to symbol #(S+L), that is, symbol #9 of the second slot as CUL PUSCH transmission symbols. If the UE attempts and succeeds in LBT at the position LBT #1 and uses the two CUL slots for transmission, all symbols between the two slots (i.e., the hatched symbols in FIG. 12(b)) are also available for the CUL PUSCH transmission. If the UE fails in the LBT at the position LBT #1, the UE may attempt LBT #2 at a boundary of the second slot, unlike FIG. 12(a). If the UE succeeds in LBT #2, the UE may use the first symbol to symbol #(S+L) of the second slot in transmitting the CUL PUSCH. In this method, therefore, the position of the starting symbol of the CUL PUSCH and the position of the DMRS may vary according to the position of a CUL slot among allocated consecutive CUL slots, that is, according to whether the CUL slot is the first (starting) slot of a UL burst or one of the other successive CUL slots except for the first (starting) slot. When a transmission starts in a slot boundary, that is, the first symbol of each of the second and following symbols, the second slot may be the second slot counted from the actual transmission start, or the second one of slots configured irrespective of the actual transmission start. That is, when three consecutive CUL slots are allocated to different UEs, a specific UE may start a transmission in the first slot. Even though a second UE starts a transmission in the second slot, the second UE may attempt to start the transmission at the boundary of the slot.

When the UE performs a single slot/PUSCH transmission using only a part of consecutive CUL slots allocated to the UE in method (1-1) and method (1-3), the BS may configure/indicate that the ending symbol of the last transmission CUL slot is symbol #(S+L) or the last symbol of the last transmission CUL slot according to the position of symbol #S in the slot. Further, the BS may configure/indicate that the UE should not use the last symbol of the last CUL slot by a higher-layer signal or both of a higher-layer signal and a physical-layer signal, for a specific purpose (e.g., an LBT gap for UL-to-DL COT sharing).

Aside from transmission of consecutive CUL slots, if the indexes of the starting and ending symbols of CUL slots are maintained to be the same as in method (1-1), the blind detection (BD) overhead of the BS may be mitigated, and the same UCI mapping method may always be applied irrespective of the positions of slots, when consecutive CUL slots are allocated based on a fixed DMRS position in each CUL slot. Further, symbols other than CUL PUSCH symbols indicated by an SLIV may be used for transmission of a PDCCH/PDSCH or a PUCCH/SRS.

In method (1-3), the position of the starting symbol for a transmission from the UE may be changed to symbol #S or a slot boundary in each CUL slot. However, it may be assumed that the starting symbol is a slot boundary in each of the remaining symbols except for the first slot among consecutive CUL slots that the BS has allocated to each UE, thereby mitigating the BD overhead of the BS. Because more symbols are available for a CUL PUSCH transmission in method (1-3) than in method (1-1), the method described in method (1-3) may be more favorable in terms of resource efficiency or enable high-reliability transmission.

[Proposed method #2] It is assumed that the BS has allocated CUL transmission slot(s) to the UE by an offset, a slot periodicity, and the number of allocated slots, and configured/indicated time/frequency/code resources required for a CUL transmission, such as a frequency/DMRS sequence, for/to the UE. The UE interprets that as many consecutive time resources as a multiple of a length L from symbol #S in the first of the allocated CUL slots have been allocated according to L and S indicated by an SLIV, and transmits a CUL PUSCH in each CUL slot in the time resources.

Up to a symbol that does not exceed the boundary of the last of the allocated consecutive CUL slots may be allocated. When symbols of the length L are across the boundary between two slots, the symbols may be included as transmission symbols in a slot to which the symbols belong.

However, the BS may configure/indicate that the UE should not use the last symbol of the last CUL slot in the transmission by a higher-layer signal or both of a higher-layer signal and a physical-layer signal, for a specific purpose (e.g., an LBT gap for UL-to-DL COT sharing).

For UE multiplexing, the BS may configure a starting position candidate at a sub-symbol level between symbol #S and symbol #(S+1) or between symbol #(S−1) and symbol #S, and the CP of the starting symbol may be extended by a length that does not exceed one symbol duration defined for the SCS of the CUL PUSCH and fill the space from a time of LBT success to a boundary of the next symbol.

Figure 13:
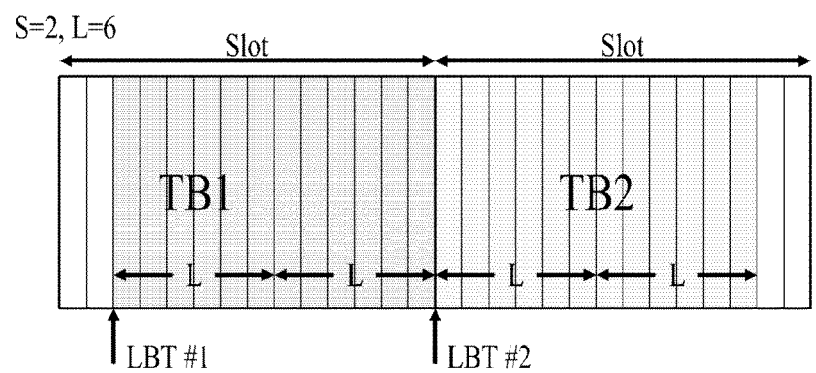

FIG. 13 illustrates an example of proposed method #2. When the number of allocated slots is '2', the periodicity is '4', and the SLIV indicates S=2 and L=6, CUL slots and CUL PUSCH symbols may be allocated as illustrated in FIG. 13.

Referring to FIG. 13, a UE to which two consecutive CUL slots are allocated may interpret the SLIV as allocating as many consecutive CUL PUSCH symbols as a multiple of 6 (L=6) from symbol #2 of the first slot to a symbol that does not exceed the boundary of the second slot, and attempt LBT in symbol #2 of the first CUL slot, for a PUSCH transmission. When the UE succeeds in the LBT at the position LBT #1 and uses both of the allocated CUL slots for the transmission, the symbols between the two CUL slots may all be used for the CUL PUSCH transmission. When the UE fails in the LBT at the position LBT #1, the UE may drop the transmission in the first slot, and attempt LBT again at a position LBT #2 being a boundary of the second slot. When the UE succeeds in the LBT, the UE may transmit the CUL PUSCH.

Proposed method #2 may be used for non-slot-based scheduling, and a plurality of CUL PUSCHs may be allocated in CUL slots by reinterpreting an SLIV. For example, if sets of L allocated symbols in each CUL slot are treated as length-L CUL PUSCH transmission units, not as one slot-level CUL PUSCH transmission unit, four CUL PUSCH symbols may be allocated in two CUL slots in FIG. 13. According to this method, even though the UE fails in LBT at the first starting position of a CUL slot, the UE has a plurality of LBT opportunities in the slot without the need for dropping the whole CUL slot. Accordingly, transmission opportunities may be increased and latency may be decreased.

[Proposed method #3] The position of a DMRS symbol is configured in a CUL PUSCH transmission slot as follows.

(3-1) The DMRS symbol is positioned in the starting symbol, symbol #S indicated by an SLIV or in symbol #(S+1) in every CUL slot.

A. Characteristically, when S is larger than L in the SLIV, the DMRS symbol may be positioned at a slot boundary of the last transmission slot, that is, in the first symbol of the last transmission slot.

(3-2) The DMRS symbol is positioned in symbol #S or symbol #(S+1) in the starting one of allocated consecutive CUL slots, and in the first (or second) symbol of each of the following middle slots included in a UL burst.

A. When the transmission starts at the boundary of a slot, a starting position candidate at a sub-symbol level may exist between the first symbol and the second symbol of the slot, or between the last symbol of the previous slot and the first symbol of the slot.

B. When the position of the sub-symbol-level starting position candidate is determined to be the first symbol or the second symbol, the same DMRS position is maintained in the following slots.

For UE multiplexing, the BS may configure a starting position candidate at a sub-symbol level between symbol #S and symbol #(S+1) or between symbol #(S−1) and symbol #S, and the CP of the starting symbol may be extended for a length that does not exceed one symbol duration defined for the SCS of the CUL PUSCH from a time of LBT success and the boundary of the next symbol. Accordingly, the DMRS may be positioned in symbol #S, symbol #(S+1), the first symbol of a slot, or the second symbol of the slot according to the transmission position of an extended CP.

When PUSCH symbols are configured in CUL slots according to proposed method #1 or proposed method #2, the DMRS symbol may be positioned constantly in symbol #S indicated by an SLIV or symbol #(S+1) irrespective of a single-slot/multi-slot transmission or even though the index of the starting/ending symbol varies in each slot. This method may decrease the BD overhead of the BS and offers a gain in terms of complexity. Further, the same CUL UCI mapping method may be applied to all CUL slots. However, when PUSCH symbols are allocated with the index of the ending symbol set to L, the DMRS symbol may be positioned in the first or second symbol of the last transmission slot only when S>L.

In method (3-2), the DMRS is positioned in symbol #S or symbol #(S+1) in the first one of consecutive allocated CUL slots, and in the first or second symbol of the following middle slot of a burst. If the DMRS is positioned in the first symbol of the middle slot, the DMRS is also positioned in the first symbol in every following slot, whereas if the DMRS is positioned in the second symbol of the middle slot, the DMRS is also positioned in the second symbol in every following slot.

If the SLIV indicates PUSCH mapping type A, the DMRS may be positioned near to symbol #S. If the SLIV indicates PUSCH mapping type B, the DMRS may be positioned at a boundary of a slot, that is, the first symbol of the slot, or the second slot of the slot according to a sub-symbol-level starting position candidate in each of the remaining slots except for the starting slot.

[Proposed method #4] When the BS has allocated CUL transmission slot(s) to the UE by an offset, a slot periodicity, and the number of allocated slots, and configured/indicated time/frequency/code resources required for a CUL transmission, such as a frequency/DMRS sequence, for/to the UE, the UE selects one of one or more SLIVs, transmits a CUL PUSCH based on the selected SLIV, and indicates the selected SLIV and information about transmitted CUL slots/PUSCHs to the BS by CUL UCI.

However, the BS may configure/indicate that the UE should not use the last symbol of the last CUL slot in the transmission by a higher-layer signal or both of a higher-layer signal and a physical-layer signal, for a specific purpose (e.g., an LBT gap for UL-to-DL COT sharing).

For UE multiplexing, the BS may configure a starting position candidate at a sub-symbol level between symbol #S and symbol #(S+1) or between symbol #(S−1) and symbol #S, and the CP of the starting symbol may be extended for a length that does not exceed one symbol duration defined for the SCS of the CUL PUSCH from a time of LBT success to the boundary of the next symbol.

The UE may select one of one or more SLIVs preconfigured/indicated by the BS and transmits a CUL PUSCH in an allocated CUL slot, along with CUL UCI including information about the SLIV used for the transmission and the number of CUL PUSCHs or CUL slots transmitted so far in a similar manner to a counter-DAI or total-DAI. For example, the state of a specific field in the UCI may be changed each time the CUL PUSCH is transmitted or may indicate the number of CUL PUSCHs accumulated so far to the BS.

Alternatively, the CUL UCI may include information indicating whether the current transmitted CUL PUSCH is the first or last one. For example, because the BS may miss the first CUL PUSCH transmitted by the UE, the UE may transmit one or both of information indicating the first CUL PUSCH and information indicating the last CUL PUSCH in the CUL UCI in a specific bit field to the BS.

The above-described SLIV information, counter-DAI or total-DAI information, and information about the number of a transmission slot may all be included in the UCI or only specific information or a combination of pieces of specific information may be included in the UCI.

[Proposed method #5] When the BS has allocated CUL transmission slot(s) to the UE by an offset, a slot periodicity, and the number of allocated slots, and configured/indicated time/frequency/code resources required for a CUL transmission, such as a frequency/DMRS sequence, for/to the UE, non-slot-based scheduling is performed.

(5-1) When all symbols of CUL slots allocated at a slot level are available for a CUL PUSCH transmission, CUL PUSCH transmission resources of a length of 2 or 7 symbols are allocated by setting a symbol periodicity of 2 or 7 by a higher-layer signal.

(5-2) A slot periodicity and a symbol periodicity are configured/indicated by a higher-layer signal or both of a higher-layer signal and a physical-layer signal, and the transmission length of a CUL PUSCH indicated by an SLIV is set equal to the symbol periodicity.

However, the BS may configure/indicate that the UE should not use the last symbol of the last CUL slot in the transmission by a higher-layer signal or both of a higher-layer signal and a physical-layer signal, for a specific purpose (e.g., an LBT gap for UL-to-DL COT sharing).

For UE multiplexing, the BS may configure a starting position candidate at a sub-symbol level between symbol #S and symbol #(S+1) or between symbol #(S−1) and symbol #S, and the CP of the starting symbol may be extended by a length that does not exceed one symbol duration defined for the SCS of the CUL PUSCH from a time of LBT success to the boundary of the next symbol.

When CUL transmission slots are allocated by an offset, a slot periodicity, and the number of slots to be allocated within a period, all symbols of the allocated CUL slots may be used for a CUL PUSCH transmission, similarly to Rel-15 AUL. In this case, if a symbol periodicity of 2 or 7 symbols is configured/indicated by a higher-layer signal or both of a higher-layer signal and a physical-layer signal as in method (5-1), all symbols of the CUL slots may be used for CUL PUSCH transmissions, without a gap between the transmissions. The UE may transmit a plurality of 2-symbol or 7-symbol CUL PUSCHs in the CUL slots according to the configured/indicated symbol periodicity.

Likewise in method (5-2), after CUL transmission slots are allocated with a slot periodicity, a plurality of CUL PUSCHs are allocated based on a symbol periodicity and an SLIV in the slots. Although a transmission length indicated by the SLIV may be equal to or smaller than the symbol periodicity, the transmission length smaller than the symbol periodicity may cause a gap between CUL PUSCH transmission units each having the allocated transmission length. Accordingly, the SLIV may be configured such that the transmission length of the CUL PUSCH indicated by the SLIV is matched to the symbol periodicity, to reduce unnecessary LBT operations and enable more efficiency allocation of symbol resources.

According to the above method, even though the UE fails in LBT at the first starting position of a CUL slot, the UE may have a plurality of LBT opportunities in the CUL slot without the need for dropping the whole one slot, thereby reducing latency.

[Proposed method #6] When the BS has allocated CUL transmission slot(s) to the UE by an offset, a slot periodicity, and the number of allocated slots, CUL UCI is mapped according to a method of allocating transmission symbols in the CUL slots or an SLIV interpretation method. For example, when time resources for a CG are allocated by an SLIV reinterpreted by the above proposed methods, a UCI is mapped as follows.

(6-1) When transmission symbols are allocated according to method (1-1) of proposed method #1, the DMRS symbol is located at the same position in each CUL slot. Accordingly, CUL UCI may also be mapped in a frequency-first manner in the same area, that is, an available symbol shortly after the first DMRS irrespective of the position of a slot among allocated consecutive CUL slots (burst). This method may be applied to every CUL slot.

(6-2) When transmission symbols are allocated according to method (1-2) of proposed method #1, the position of a transmission starting symbol and a DMRS position may vary in the following CUL slots (the remaining allocated consecutive CUL slots except for the first slot) depending on whether LBT is successful in the first (starting) slot of a UL burst. Therefore, CUL UCI may be mapped in a frequency-first manner, starting from an available symbol shortly after the first DMRS symbol according to the position of the starting symbol and the position of the DMRS symbol in a corresponding CUL slot.

(6-3) When non-slot-based CUL PUSCH scheduling is performed according to proposed method #5, CUL UCI may be transmitted in all sub-slots of a slot.

(6-4) When non-slot-based CUL PUSCH scheduling is performed according to proposed method #5, CUL UCI may be transmitted only in a specific one sub-slot of a slot.

A. The specific one sub-slot of the slot may be preconfigured/indicated by the BS. If the specific one sub-slot of the slot is not preconfigured/indicated by the BS, an operation may be performed based on an assumed default sub-slot (the earliest or last sub-slot in time).

When NR UCI is piggybacked to the CUL PUSCH, the CUL UCI may first be mapped according to method (6-1)

and method (6-2), and then a Rel-15 NR UCI mapping method may be applied on the assumption that resources to which the CUL UCI is mapped are not available like a DMRS or phase tracking reference signal (PTRS) symbol.

Further, when there is an available symbol preceding the first DMRS symbol in method (6-1) and method (6-2), the CUL UCI may be mapped, starting from the symbol to the left of the DMRS. Further, when an additional DMRS is configured, the CUL UCI may be mapped, starting from an available symbol shortly next to or to the left of the last DMRS symbol, not the first DMRS symbol.

If a starting position candidate at a sub-symbol level is configured between symbol #S and symbol #(S+1), for UE multiplexing, the first symbol may be excluded from CUL UCI or NR UCI mapping symbols. Further, when the BS configures that the last symbol of the last transmission slot is not transmitted, this symbol may also be excluded from UCI mapping.

In the case of mapping the CUL UCI to the CUL PUSCH in method (6-1), the CUL UCI (CG UCI) may always be mapped at a hatched symbol position in each CUL slot (e.g., the fifth symbol of each slot) as illustrated in FIG. 14(*a*), referring to method (1-1) of proposed method #1.

As mentioned in method (1-1) of proposed method #1, when the UE fails in LBT in the first of allocated consecutive CUL slots, the UE attempts LBT again in symbol #s of the next allocated CUL slot. Therefore, once an SLIV is set, the position of the starting symbol of a CUL PUSCH and the position of a DMRS symbol are maintained to be the same in every CUL slot. Accordingly, the CUL UCI may also be mapped to the same symbol position all the time irrespective of the position of a slot among the consecutive CUL slots. This method is advantageous in that the BS may decode a DMRS and CUL UCI in the same symbols irrespective of the sequence of a slot in a CUL PUSCH burst of a specific UE.

In the case of mapping the CUL UCI to the CUL PUSCH in method (6-2), the CUL UCI (CG UCI) may be mapped at a hatched symbol position in each CUL slot (e.g., the fifth symbol of the first slot and the second symbol of the second slot) as illustrated in FIG. 14(*b*), referring to method (1-3) of proposed method #1.

As mentioned in method (1-3) of proposed method #1, when the UE fails in LBT in the first of allocated consecutive CUL slots, the UE attempts LBT again in the first symbol of the next allocated CUL slot. Therefore, the position of the starting symbol of a CUL PUSCH and the position of a DMRS symbol may vary depending on whether a slot is the starting or middle one of the allocated consecutive CUL slots in the burst. In this case, the BS may decode the CUL UCI based on the position of the DMRS symbol detected by BD on two DMRS symbol positions.

[Proposed method #7] When NR UCI is piggybacked to a CUL PUSCH, performance degradation caused by a CUL UCI-incurred increase in the distance between an HARQ-ACK and a DMRS symbol is overcome as follows.

(7-1) The CUL UCI is mapped in a part of the RBs in a specific one of interlaces allocated for the CUL PUSCH transmission, and the NR UCI is mapped to the remaining RBs.

(7-2) The CUL UCI and the NR UCI are mapped to RBs of different interlaces among the interlaces allocated for the CUL PUSCH transmission.

(7-3) The CUL UCI is mapped to an available symbol with a high symbol index and an available symbol with a low symbol index with respect to a DMRS symbol in the CUL PUSCH, and then the NR UCI is mapped to an available symbol with the next higher symbol index and an available symbol with the next lower symbol index.

(7-4) The CUL UCI is mapped to an available symbol with a high symbol index with respect to the first DMRS symbol in the CUL PUSCH, and an NR UCI HARQ-ACK is mapped in a frequency-first manner, starting from an available symbol with a symbol index lower than that of the DMRS symbol.

(7-5) If there is an additional DMRS, the HARQ-ACK in the NR UCI is farther from the DMRS symbol by the CUL UCI, thus causing performance degradation. Therefore, when the NR UCI is spaced from the DMRS symbol by X or more symbols, the CUL UCI is mapped in a frequency-first manner, starting from an available symbol with the next higher symbol index than that of the first DMRS symbol (or with the next smaller symbol index that of the first DMRS symbol, if there is an available preceding symbol) and the NR UCI is mapped in a frequency-first manner, starting from an available symbol with the next higher symbol index (or with the next smaller symbol index) than that of the second DMRS symbol.

X may be preconfigured/indicated by a higher-layer signal or both of a higher-layer signal and a physical-layer signaling from the BS. If X is not preconfigured/indicated, the UE may operate based on an assumed default value (e.g., 2 symbols).

In method (7-1), for example, when one interlace includes 10 RBs, the BS may separately signal the number of RBs to which CUL UCI will be mapped among the RBs or set the number of RBs in consideration of the payload size of the CUL UCI and a beta offset for the CUL UCI. Alternatively, the BS may configure the number of RBs to be allocated, according to the ratio between CUL UCI REs and NR HARQ-ACK REs. If a CUL PUSCH is shared between UEs, RBs may be divided between the UEs based on a specific value pre-configured/indicated by the BS. The above-described methods may also be applied in the same manner to method (7-2) in which how many interlaces among a plurality of interlaces are to be allocated to CUL UCI or NR UCI should be determined.

Figure 15:
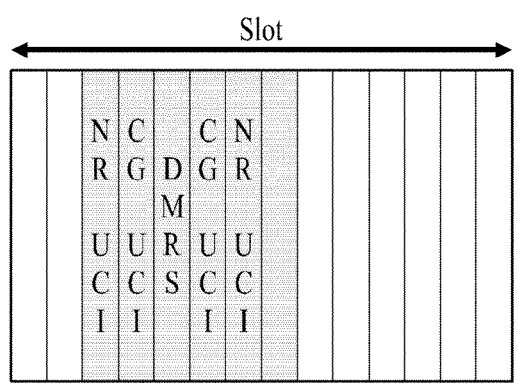

In method (7-3), similarly to an LTE UCI mapping method, CUL UCI (CG UCI) and NR UCI are mapped to available symbols to the right and left of a DMRS symbol, as illustrated in FIG. 15. Herein, the CUL UCI is first mapped to right and left available symbols closer to the DMRS and then the NR UCI is mapped alternately to the next right and left available symbols of the DMRS.

In method (7-4), when CUL UCI is mapped to an available symbol with a higher symbol index than the first DMRS symbol in a CUL PUSCH, there may be no room for an HARQ-ACK beside the DMRS, as is the case with HARQ-ACK mapping in the legacy Rel-15 NR. Therefore, the HARQ-ACK is mapped in a frequency-first manner, starting from a symbol on the left side of the DMRS. For example, if the index of a DMRS symbol is n, when the CUL UCI is fully mapped to symbol #(n+1) and then the NR UCI is mapped successively, the NR UCI may be allocated to symbol #(n+2) due to the absence of available resources in symbol #(n+1). In this case, since the HARQ-ACK may be far from the DMRS symbol, the HARQ-ACK is mapped to symbol #(n−1).

In method (7-5), if the CUL UCI is mapped, starting from an available close symbol on the right or left side of the DMRS symbol, the NR UCI may become far from the DMRS, resulting in the degradation of decoding performance. Therefore, when an additional DMRS is configured so that a plurality of DMRS symbols exist in a CUL slot, and an available symbol for NR UCI mapping is X or more symbols apart from the first DMRS symbol after the CUL UCI is mapped to an available right or left symbol immediately next to the first DMRS symbol, the NR UCI is mapped to an available right or left symbol immediately next to the additional DMRS symbol. X may be preconfigured/indicated by a higher-layer signal or both of a higher-layer signal and a physical-layer signal from the BS. If X is not preconfigured/indicated, the UE may operate based on an assumed default value (e.g., 2 symbols).

[Proposed method #8] When the BS transmits decoding results (e.g., ACKs/NACKs) for specific HARQ process IDs by CUL DFI, the BS further includes an NDI for each HARQ process ID included in the CUL DFI, so that the NDI is used for determining a CUL PUSCH retransmission/new transmission and CWS control at the UE.

Proposed method #8 is intended to prevent a problem caused by a limited number of ACK transmissions of the BS and HARQ process ID collision between a CG and a DG.

For example, it is assumed that the BS transmits an ACK to the UE by CUL DFI and schedules a PUSCH (DG) using the same ID as an HARQ process ID for a CG. If the UE fails in receiving the DFI, the UE may perform a retransmission for a CG PUSCH with the same HARQ process ID. Then, HARQ process ID collision may occur between the CG PUSCH and a DG PUSCH. In addition, an A/N default value of the DFI is NACK. Once the DFI is transmitted, it may not be transmitted again. Therefore, if the BS transmits the DFI as ACK once, the BS may not transmit the DFI including ACK again even though the UE fails in receiving the DFI. Therefore, proposed method #8 proposes a method of including an NDI value in CUL DFI to solve the above-described problem.

However, the decoding result of the CUL DFI and the NDI value may not be reflected in determining a retransmission/new transmission and CWS adjustment based on a specific timeline (e.g., in consideration of the processing capability of the UE or BS). For example, the UE may not reflect a CUL/GUL decoding result (e.g., ACK/NACK) arriving at the UE before a CUL PUSCH to CUL DFI feedback (K3) and a GUL PUSCH to UL grant timing (K4) (pre)configured or indicated by the BS in determination of a retransmission/new transmission and CWS adjustment, ignoring the CUL/GUL decoding result as invalid. If there is no K3 value and/or K4 value (pre)configured/indicated to the UE, the following may be performed based on an assumed default value (e.g. 4 ms), and the K3 value may be equal to or different from the K4 value. GUL PUSCH represents granted UL-PUSCH, that is, PUSCH scheduled by a dynamic UL grant (e.g., PDCCH).

Further, the CUL PUSCH retransmitted based on the CUL PUSCH decoding result in the CUL DFI transmitted after K3 is retransmitted using CG resources, and CWS adjustment based on the NDI value included in the CUL DFI and the CUL/GUL PUSCH decoding result is performed only with an ACK/NACK result corresponding to a reference CUL/GUL PUSCH used for CWS adjustment among the previous transmitted CUL/GUL PUSCHs.

(8-1) A CUL/GUL decoding result (ACK/NACK) for a specific HARQ process ID included in CUL DFI transmitted before K3/K4 after a CUL/GUL PUSCH transmission is ignored without being reflected in CWS adjustment or a CUL PUSCH retransmission in CG resources, regardless of an NDI value.

(8-2) For CUL DFI transmitted K3/K4 after a CUL/GUL PUSCH transmission, the following is performed.

A. In the case of the NDI value of a specific HARQ process equal to that of the previously transmitted CUL/GUL PUSCH, ACK as a CUL/GUL decoding result (ACK/NACK), and a reference CUL/GUL PUSCH, the CWS of the UE is initialized to a minimum value. In the case of NACK as the CUL/GUL decoding result and a reference CUL/GUL PUSCH, the CWS of the UE is incremented by one level, and the CUL PUSCH may be retransmitted in CG resources for the HARQ process ID.

B. If the NDI value for the specific HARQ process ID is different from that of the previously transmitted CUL/GUL PUSCH, it is determined that the BS has failed in the reception. When the decoding result is for a reference CUL/GUL PUSCH, the CWS of the UE is incremented by one level, and a CUL PUSCH retransmission is performed in CG resources.

In the Rel-15 NR CG, the BS does not explicitly indicate a decoding result for a CG PUSCH to the UE. However, in the NR-U CG, the BS explicitly transmits a decoding result for a received CUL PUSCH by CUL DFI, as in further enhanced LAA AUL (FeLAA AUL). The UE then uses an ACK/NACK result for an HARQ process ID configured with CUL in determining whether a retransmission is needed and in CWS adjustment based on the corresponding information. An ACK/NACK result for a GUL HARQ process ID is referred to only for CWS adjustment of the UE. The ACK/NACK result included in the CUL DFI may include only an ACK/NACK for an HARQ process ID configured with CUL, or may include only ACKs/NACKs for a part of total CUL HARQ process IDs according to a configuration/indication. Further, the ACK/NACK results for the GUL HARQ process IDs may or may not be included in the CUL DFI according to a configuration/instruction, and ACK/NACK results for all HARQ process IDs may be included in the CUL DFI.

In FeLAA AUL, a decoding result of ACK for a specific HARQ process ID included in AUL DFI is allowed to be transmitted only once. Therefore, after the BS transmits the decoding result once, the AUL DFI is always filled with a default value of 'NACK'. Therefore, even though the UE misses the AUL DFI or fails to decode the AUL DFI, the BS may not transmit the ACK again for the corresponding HARQ process ID in the next AUL DFI, and fills the AUL DFI with NACK, for transmission. Accordingly, a mismatch may occur between decoding results of the UE and the BS, and an unnecessary retransmission may occur.

According to proposed method #8, if the BS transmits an NDI value together with an ACK/NACK result for each HARQ process ID included in CUL DFI, the limitation on the number of ACK transmissions in DFI as described above is not necessary, and an efficient new transmission and retransmission may be possible by preventing the mismatch of decoding results between the BS and the UE.

Therefore, when the BS transmits decoding results (ACKs/NACKs) for specific HARQ process IDs in CUL DFI as in the proposed method, the BS may further include an NDI value for each HARQ process ID included in the CUL DFI to clearly inform the UE of whether ACKs/NACKs included in the CUL DFI are related to previously transmitted data or new data. Further, due to the presence of NDI values, the BS may transmit ACK/NACK results for previously transmitted PUSCHs a plurality of times.

A CUL/GUL decoding result (ACK/NACK) for a specific HARQ process ID included in CUL DFI transmitted before K3/K4 after a CUL/GUL PUSCH transmission may be ignored without being reflected in CWS adjustment or a CUL PUSCH retransmission in CG resources, regardless of an NDI value.

For CUL DFI transmitted K3/K4 after a CUL/GUL PUSCH transmission, if an NDI value for a specific HARQ process ID is the same as that of a previously transmitted CUL/GUL PUSCH, the decoding result (ACK/NACK) of the CUL/GUL PUSCH is ACK, and the CUL/GUL PUSCH is a reference CUL/GUL PUSCH, the CWS of the UE is initialized to a minimum value. If the decoding result (ACK/NACK) of the CUL/GUL PUSCH is NACK and the CUL/GUL PUSCH is a reference CUL/GUL PUSCH, the CWS of the UE may be incremented by one level and the CUL PUSCH may be retransmitted in CG resources for the HARQ process ID.

Further, when the NDI value of the specific HARQ process ID is different from that of the previously transmitted CUL/GUL PUSCH, it is determined that the BS has failed in the reception. When the corresponding decoding result is for the reference CUL/GUL PUSCH, the CWS of the UE is incremented by one level, and the CUL PUSCH may be retransmitted in CG resources.

However, the decoding results of the CUL/GUL PUSCH and the NDI values included in the CUL DFI may include ACKs/NACKs and NDI values for a part of all HARQ process IDs, and for some HARQ process ID, only an ACK/NACK result without an NDI value may be included in the DFI.

[Proposed method #9] In the case where NR UCI is piggybacked to a CUL PUSCH, if three or more types of UCI types are piggybacked, two specific UCI types are jointly encoded by applying one of specific beta offsets and transmitted on a CUL PUSCH. Alternatively, a specific type of UCI is dropped according to priority.

For example, in the case where NR UCI is piggybacked to a CUL PUSCH, CUL UCI and the NR UCI (HARQ-ACK, CSI part 1, and CSI part 2) may be transmitted on the CUL PUSCH. CSI part 1 may have a fixed payload size and may be used to identify the number of information bits in CSI part 2.

For example, when UCI is multiplexed in a CUL PUSCH, the maximum number of separately encoded UCIs may be 3 in the NR system.

The following embodiment proposes a method of multiplexing three UCIs in a CUL PUSCH, with one UCI dropped, or jointly encoding two specific UCIs and then multiplexing three UCIs. Further, when the two specific UCIs are jointly encoded, methods of determining a UCI whose beta offset is to be used are proposed below.

(9-1) CUL UCI and an HARQ-ACK are jointly encoded and multiplexed in a CUL PUSCH.

A. In the case where an HARQ-ACK is jointly encoded with CUL UCI or CSI part 1, if the number N of actually transmitted HARQ-ACK bits exceeds 2, the UE performs the joint coding to N bits. If N is equal to or less than 2, the UE performs the joint coding to 2 bits (different from N).

B. In the case of joint encoding between an HARQ-ACK and CUL UCI or CSI part 1, when a CSI report is configured with/includes only CSI part 1 without CSI part 2 or there is no CSI report, the HARQ-ACK is separately encoded.

(9-2) An HARQ-ACK and CSI part 1 are jointly encoded and multiplexed in a CUL PUSCH.

A. When the number of REs to which the jointly encoded HARQ-ACK and CSI part 1 are to be mapped is calculated, the number of REs is calculated by applying a beta offset configured for HARQ-ACK mapping in a DG PUSCH.

B. When the HARQ-ACK and CSI part 1 are jointly encoded and mapped, the coded bits are mapped sequentially, starting from a first non-DMRS symbol according to a rule of mapping CSI part 1 in a DG PUSCH.

(9-3) A lowest-priority UCI is dropped according to preconfigured/indicated UCI priorities and only the remaining UCIs are multiplexed.

For example, the above-described methods (9-1) and (9-2) are examples of jointly encoding two specific UCIs and then multiplexing two or more UCIs in a CUL PUSCH, when the two or more UCIs are transmitted on the CUL PUSCH.

However, in methods (9-1) and (9-2), when a beta offset is configured/indicated for each of the two UCIs, one of the two beta offsets is used according to an indication/configuration from the BS. Or if there is no indication/configuration from the BS, a preconfigured method is used. For example, the larger or smaller between the two beta offsets may be used. Alternatively, in the absence of beta offsets configured/indicated for the two UCIs, a preconfigured beta offset (e.g., a value defined in a technical specification) may be assumed, or when only one of the two beta offsets has been configured/indicated, the configured/indicated beta offset may be used.

When CUL UCI is always multiplexed in a CUL PUSCH transmission and transmission of NR UCI such as an HARQ-ACK and/or CSI part 1 and/or CSI part 2 in CUL resources is indicated, the NR UCI may be piggybacked to the CUL PUSCH and thus transmitted together with the CUL PUSCH. However, when transmission of three NR-UCIs in CUL resources in addition to CUL UCI is indicated, the four UCIs should be separately encoded and multiplexed. The resulting increased computation complexity may be a big burden on the UE. Therefore, when three or more UCI types are to be multiplexed in a CUL PUSCH, jointly encoding two specific UCIs and multiplexing only up to three UCIs may be useful in decreasing the computation complexity of the UE.

Therefore, when multiplexing of four UCIs in a CUL PUSCH is indicated, the UE may jointly encode CUL UCI and an HARQ-ACK and multiplex the UCIs in a CUL PUSCH as in method (9-1) or may jointly encode an HARQ-ACK and CSI part 1 and multiplex the UCIs in a CUL PUSCH as in method (9-2). A beta offset value may be indicated semi-statically or dynamically for each UCI, or no beta offset may be configured/indicated separately for some UCI. If a beta offset is configured/indicated for each of two UCIs, one of the two beta offsets may be used according to an indication/configuration from the BS. Alternatively, in the absence of the indication/configuration indicating use of a beta offset for a specific UCI from the BS, a beta offset may be used according to a pre-configuration. For example, the larger or smaller between the two beta offsets may be used. Alternatively, in the absence of beta offsets configured/indicated for the two UCIs, a predefined beta offset (e.g., a value defined in a technical specification) may be assumed, or when only one of the two beta offsets has been configured/indicated, the configured/indicated beta offset may be used.

A beta offset is a parameter used to calculate the number of REs to which coded bits are to be mapped, as described before. When UCI is piggybacked to a PUSCH, a beta offset may be used to control the coding rate of the UCI. A specific example of applying a beta offset is given as follows with reference to 3GPP TS 38.212 published before the priority date of the present disclosure. When an HARQ-ACK is transmitted on a PUSCH as in the following [reference 1], a beta offset may be used to derive the coded result of the HARQ-ACK.

[Reference 1]
For HARQ-ACK transmission on PUSCH with UL-SCH, the member of coded modulation symbols per layer for HARQ-ACK transmission, denoted as $Q_{ACK}'$, is determined as follows:

$$Q'_{ACK} = \min\left\{ \left\lceil \frac{(Q_{ACK} + L_{ACE}) \cdot \beta^{PUSCH}_{offset} \cdot \sum_{l=0}^{N^{PUSCH}_{symb,all}-1} M^{UCI}_{sc}(l)}{\sum_{r=0}^{C_{UL-SCH}-1} K_r} \right\rceil, \left\lceil \alpha \cdot \sum_{l=l_0}^{N^{PUSCH}_{symb,all}-1} M^{UCI}_{SC}(l) \right\rceil \right\}$$

where
$O_{ACK}$ is the number of HARQ-ACK bits,
if $O_{ACK} \geq 360 = L_{ACK} = 11$; otherwise $L_{ACK}$ is the number of CRC bits for HARQ-ACK determined according to Clause 6.3.1.2.1;

$$\beta^{PUSCH}_{offset} = \beta^{HARQ-ACK}_{offset};$$

$C_{UL-SCH}$ is the number of code blocks for UL-SCH of the PUSCH transmission;
if the DCI format scheduling the PUSCH transmission includes a CBGTI field indicating that the UE shall not transmit the r-th code block, $K_r=0$; otherwise, $K_r$ is the r-th code block size for UL-SCH of the PUSCH transmission;
$M_{sc}^{PUSCH}$ is the scheduled bandwidth of the PUSCH transmission, expressed as a number of subcarriers;
$M_{sc}^{PT-RS}(l)$ is the number of subcarriers in OFDM symbol l that carries PTRS, in the PUSCH transmission;
$M_{sc}^{UCI}(l)$ is the number of resource elements that can be used for transmission of UCI in OFDM symbol l, for l=0, 1, 2, . . . , $N_{symball}^{PUSCH}-1$, in the PUSCH transmission and $N_{symball}^{PUSCH}$ is the total number of OFDM symbols of the PUSCH, including all OFDM symbols used for DMRS;
for any OFDM symbol that carries DMRS of the PUSCH, $M_{sc}^{UCI}(l)=0$;
for any OFDM symbol that does not carry DMRS of the PUSCH, $M_{sc}^{UCI}(l)=M_{sc}^{PUSCH}-M_{sc}^{PT-RS}(l)$;
α is configured by higher layer parameter scaling;
$l_0$ is the symbol index of the first OFDM symbol that does not carry DMRS of the PUSCH, ater the first DMRS symbol(s), in the PUSCH transmission.

Referring to [reference 1], when an HARQ-ACK is transmitted on a PUSCH, the coded result of the HARQ-ACK may be determined in consideration of the coding rate of data transmitted on the PUSCH. A separate parameter, that is, a beta offset may be used to control the coding rate of the HARQ-ACK.

While an HARQ-ACK has been taken as an example in [reference 1], a beta offset may be configured for each of other UCI types, that is, CSI part 1, CSI part 2, and CG UCI.

For example, two UCIs to be jointly encoded may be configured by a higher-layer signal (e.g., an RRC signal). In method (9-1), for example, joint encoding and multiplexing of an HARQ-ACK and CUL UCI in a CUL PUSCH may be configured by RRC signaling. For the joint encoding of the HARQ-ACK and the CUL UCI, the UE may use one of two beta offsets configured for the HARQ-ACK and the CUL UCI according to an indication from the BS. Alternatively, when one of the two beta offsets is preconfigured, the preconfigured beta offset may be used. For example, the UE may use the beta offset of the HARQ-ACK between the beta offsets of the HARQ-ACK and the CUL UCI according to an indication from the BS or a preconfigured method.

In another method, the UE may drop a lowest-priority UCI according to preconfigured/indicated UCI priorities and multiplex only the remaining UCIs, as in method (9-3). For example, when UCIs are prioritized in the order of CUL UCI>HARQ-ACK>CSI part 1>CSI part 2 or when the priorities are not configured but pre-agreed, the UE may drop the lowest-priority UCI, that is, CSI part 2 in the above example, and multiplex the remaining three UCIs, for transmission.

When CUL UCI and an HARQ-ACK are jointly encoded and multiplexed in a CUL PUSCH as in method (9-1), the joint-coded bits may be mapped to REs in a CUL UCI mapping method or an HARQ-ACK mapping method according to a configuration/indication. Alternatively, the joint-coded bits may be mapped according to a predefined method, for example, the CUL UCI mapping method all the time. When the UE jointly encodes an HARQ-ACK and CUL UCI or CSI part 1 and the number N of HARQ-ACK bits to be actually transmitted exceeds 2, the HARQ-ACK and the CUL UCI or CSI part 1 may be jointly encoded to N bits. If N is equal to or less than 2, the HARQ-ACK and the CUL UCI or CSI part 1 may be jointly encoded to 2 bits (not N bits). Further, in the case where the HARQ-ACK and the CUL UCI or CSI part 1 are jointly encoded, when a CSI report is configured with/includes only CSI part 1 without CSI part 2 or when there is no CSI report, the HARQ-ACK may be encoded separately.

When an HARQ-ACK and CSI part 1 are jointly encoded and multiplexed in a CUL PUSCH as in method (9-2), the number of REs to which the joint-coded bits are to be mapped may be calculated by applying a beta offset configured for HARQ-ACK mapping in a DG PUSCH. When the HARQ-ACK and CSI part 1 are jointly encoded, the coded bits may be mapped sequentially, starting from a first non-DMRS symbol according to the rule of mapping CSI part 1 to a DG PUSCH. Alternatively, the coded bits may be mapped to the symbol next to the first DMRS in the CUL-PUSCH according to the HARQ-ACK mapping method.

[Proposed method #10] When multiplexing of CG UCI and an HARQ-ACK has been configured by RRC signaling and an NR HARQ-ACK is piggybacked to a CG PUSCH, a beta offset is determined for use in joint encoding of the CG UCI and the HARQ-ACK as follows.

(10-1) One value from a set of {betaOffsetACK-Index1, betaOffsetACK-Index2, betaOffsetACK-Index3} determined based on HARQ-ACK payload sizes only irrespective of the sums of payload sizes of the CG UCI and the HARQ-ACK is used for the joint encoding.

(10-2) One value from a set of {betaOffsetACK-Index1, betaOffsetACK-Index2, betaOffsetACK-Index3} determined based on the sums of payload sizes of the CG UCI and the HARQ-ACK is used for the joint encoding.

(10-3) The larger between a beta offset for the CG UCI and a beta offset for the HARQ-ACK is used for the joint encoding (the beta offset for the HARQ-ACK is one of {betaOffsetACK-Index1, betaOffsetACK-Index2, betaOffsetACK-Index3} determined based on HARQ-ACK payload sizes only).

(10-4) The larger between a beta offset for the CG UCI and a beta offset for the HARQ-ACK is used for the joint encoding (the beta offset for the HARQ-ACK is one of {betaOffsetACK-Index1, betaOffsetACK-Index2, betaOffsetACK-Index3} determined based on the sums of payload sizes of the CG UCI and the HARQ-ACK).

(10-5) When a beta offset for CG UCI is configured for each payload size and joint encoding of CG UCI and an HARQ-ACK is configured by RRC signaling from the BS, the following methods may be performed.

A. A beta offset index determined based on the payload size of the CG UCI only is selected and used for the joint encoding.

B. A beta offset index determined based on the sum of payload sizes of the CG UCI and the HARQ-ACK is selected and used for the joint encoding.

(10-6) When the BS configures the payload size of CG UCI, the following methods may be performed.

A. If the payload size of the CG UCI is equal to or larger than 3 bits and equal to or less than 11 bits, and a beta offset is configured for the CG UCI, 1) when the sum of the payload sizes of the CG UCI and the HARQ-ACK is equal to or larger than 3 bits and equal to or less than 11 bits, {a beta offset index configured for the CG UCI} or {the larger between the beta offset index configured for the CG UCI and a beta offset index configured for an HARQ-ACK equal to or larger than 3 bits and equal to or less than 11 bits} is selected and used for the joint encoding, and 2) when the sum of the payload sizes of the CG UCI and the HARQ-ACK is equal to or larger than 12 bits, a beta offset index configured for an HARQ-ACK equal to or larger than 12 bits is selected and used for the joint encoding.

B. If the payload size of the CG UCI is equal to or larger than 12 bits and a beta offset is configured for the CG UCI, the beta offset is always selected and used for the joint encoding of the CG UCI and the HARQ-ACK.

Each time a CG PUSCH is transmitted, CG UCI may be multiplexed in the CG PUSCH. When CG PUSCH(s) overlaps in a PUCCH group for which an NR HARQ-ACK feedback is indicated by the BS, the CG PUSCH may be skipped or the CG UCI and an HARQ-ACK may be jointly encoded and transmitted on the CG PUSCH, according to an RRC configuration.

When the UE is configured to multiplex CG UCI and an HARQ-ACK by an RRC configuration, the CG UCI and the HARQ-ACK are considered to be of the same UCI type and thus jointly encoded. Herein, it is necessary to determine which one of a beta offset for the CG UCI and a beta offset for the HARQ-ACK is to be used in the joint encoding.

The beta offset of the HARQ-ACK is one of {betaOffsetACK-Index1, betaOffsetACK-Index2, betaOffsetACK-Index3} according to the payload size of the HARQ-ACK. These values are for up to 2 HARQ-ACK information bits, more than 2 and up to 11 HARQ-ACK information bits, and more than 11 bits, respectively.

For example, referring to 3GPP TS 38.213 published before the priority date of the present disclosure, the above-described set of {betaOffsetACK-Index1, betaOffsetACK-Index2, betaOffsetACK-Index3} may respectively correspond to $I_{offset,0}^{HARQ-ACK}$, $I_{offset,1}^{HARQ-ACK}$, and $I_{offset,2}^{HARQ-ACK}$ in [reference 2]

| [Reference 2] | |
|---|---|
| $I_{offset,0}^{HARQ-ACK}$ or $I_{offset,1}^{HARQ-ACK}$ or $I_{offset,2}^{HARQ-ACK}$ | $\beta_{offset}^{HARQ-ACK}$ |
| 0 | 1.000 |
| 1 | 2.000 |
| 2 | 2.500 |
| 3 | 3.125 |
| 4 | 4.000 |
| 5 | 5.000 |
| 6 | 6.250 |
| 7 | 8.000 |
| 8 | 10.000 |
| 9 | 12.625 |
| 10 | 15.875 |
| 11 | 20.000 |
| 12 | 31.000 |
| 13 | 50.000 |
| 14 | 80.000 |
| 15 | 126.000 |
| 16 | Reserved |
| 17 | Reserved |
| 18 | Reserved |
| 19 | Reserved |
| 20 | Reserved |
| 21 | Reserved |
| 22 | Reserved |
| 23 | Reserved |
| 24 | Reserved |
| 25 | Reserved |
| 26 | Reserved |
| 27 | Reserved |
| 28 | Reserved |
| 29 | Reserved |
| 30 | Reserved |
| 31 | Reserved |

For example, if a set of beta offset indexes {4, 9, 12} is set for an HARQ-ACK and the payload size of the HARQ-ACK is 6 bits, 12.625 corresponding to '9' in [reference 2] may be used as the beta offset of the HARQ-ACK because 6 bits belong to a range corresponding to betaOffsetACK-Index2.

When the UE is configured to multiplex CG UCI and an HARQ-ACK and transmit the multiplexed CG UCI and an HARQ-ACK on a CG PUSCH by an RRC configuration, the UE may jointly encode the CG UCI and the HARQ-ACK by using a beta offset determined in any of method (10-1) to method (10-4).

In method (10-1) and method (10-2), the CG UCI and the HARQ-ACK are jointly encoded by using one of three beta offset indexes determined based on HARQ-ACK payload sizes. One of the three HARQ-ACK beta offset indexes is selected based on the payload size of the HARQ-ACK only, irrespective of the sum of payload sizes of the HARQ-ACK and the CG UCI in method (10-1), whereas one of the three HARQ-ACK beta offset indexes is selected based on the sum of the payload sizes of the HARQ-ACK and the CG UCI in method (10-2).

According to method (10-1), a beta offset for an HARQ-ACK, determined in consideration of the payload size of the HARQ-ACK only is used for joint encoding of the HARQ-ACK and CG UCI. According to method (10-2), a beta offset for an HARQ-ACK, determined in consideration of the sum of payload sizes of the HARQ-ACK and CG UCI is used for joint encoding of the HARQ-ACK and the CG UCI. That is, method (10-1) and method (10-2) are identical in that three indexes related to beta offsets for an HARQ-ACK are used, except for criterions based on which ranges of numbers of bits corresponding to the three indexes are determined. In method (10-1), a value indicated by an index corresponding to a range to which the payload size of an HARQ-ACK belongs is used as a beta offset, only in consideration of the payload size of the HARQ ACK. In method (10-2), a value indicated by an index corresponding to a range to which the sum of payload sizes of an HARQ-ACK and CG UCI belongs is used as a beta offset. For example, if the payload size of each of an HARQ-ACK and CG UCI is 6 bits, the beta offset of the HARQ-ACK corresponding to betaOffsetACK-Index2 is used for joint encoding of the HARQ-ACK and CG UCI in method (10-1), whereas the beta offset of the HARQ-ACK corresponding to betaOffsetACK-Index3 is used for the joint encoding in method (10-2). For example, according to method (10-2), the sum of the payload sizes of the HARQ-ACK and the CG UCI may be larger than at least 2 bits, Therefore, only $I_{offset,1}^{HARQ-ACK}$ and $I_{offset,2}^{HARQ-ACK}$ corresponding to betaOffsetACK-Index2 and betaOffsetACK-Index3, respectively may be considered. That is, if the sum is equal to or less than 11 bits, the beta offset of the HARQ-ACK corresponding to betaOffsetACK-Index2 may be used in the joint encoding. If the sum is larger than 11 bits, the beta offset of the HARQ-ACK corresponding to betaOffsetACK-Index3 may be used in the joint encoding.

In method (10-3) and method (10-4), the larger between a beta offset for the HARQ-ACK and a beta offset for the CG UCI is used for the joint encoding. One of the three HARQ-ACK beta offset indexes is selected based on the payload size of the HARQ-ACK only and the larger between the selected HARQ-ACK beta offset and the beta offset for the CG UCI is used in method (10-3), whereas one of the three HARQ-ACK beta offset indexes is selected based on the sum of the payload sizes of the HARQ-ACK and the larger between the selected HARQ-ACK beta offset and the beta offset for the CG UCI is used in method (10-4).

In method (10-5-A), when a plurality of beta offset indexes are configured for the CG UCI according to payload sizes, like the HARQ-ACK, one of the CG UCI beta offset indexes is selected based on the payload size of the CG UCI only. In method (10-5-B), one of the CG UCI beta offset indexes is selected based on the sum of the payload sizes of the CG UCI and the HARQ-ACK.

Figure 16:
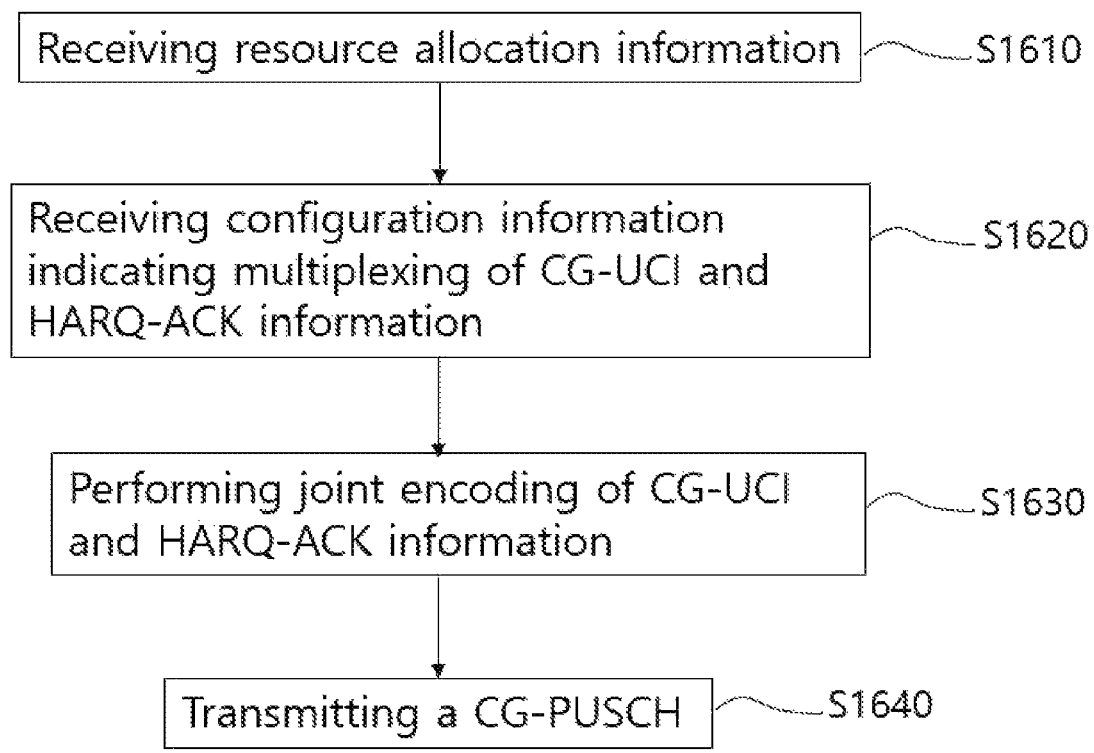
FIGS. 16, 17 and 18 illustrate signal transmission procedures according to an embodiment of the present disclosure.
Figure 17:
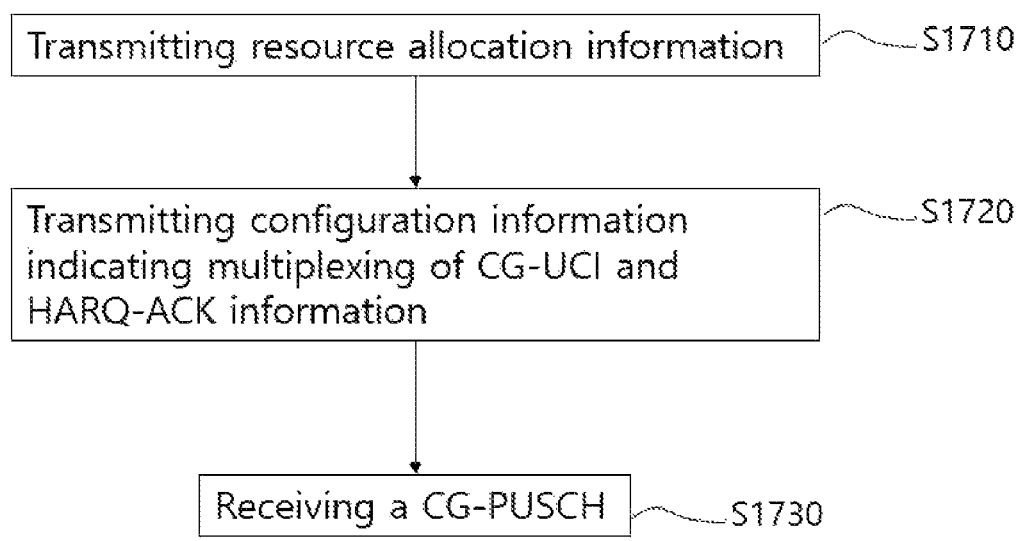
Figure 18:
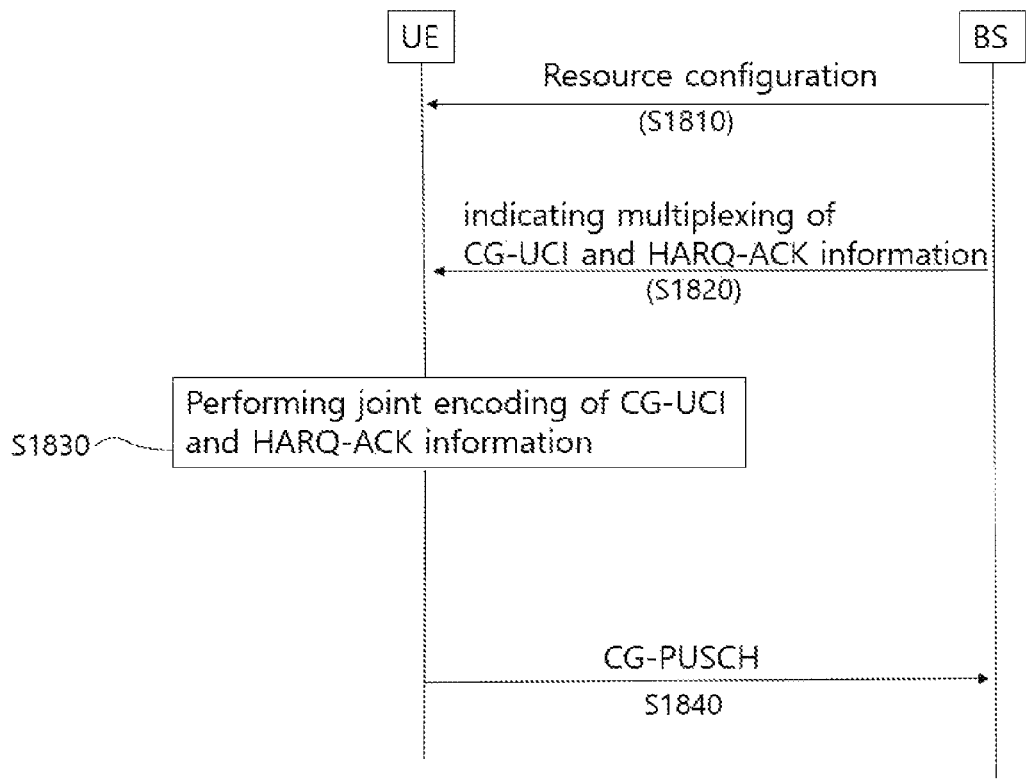

FIGS. 16, 17 and 18 illustrate a signal transmission process according to an embodiment of the present disclosure.

Referring to FIGS. 16, 17 and 18, a UE receives resource allocation information for a UL transmission from a BS (S1610, S1710, and S1810). The resource allocation information may relate to a CG-based UL transmission, not a DG grant involving a PDCCH. The UE receives configuration information indicating multiplexing between CG UCI and HARQ-ACK information (S1620, S1720, and S1820). When multiplexing between CG UCI and HARQ-ACK information is configured, the UE jointly encodes the CG UCI and the HARQ-ACK information (S1630 and S1830). The UE transmits a CG PUSCH in which the joint-encoded information is multiplexed to the BS (S1640, S1730, and S1840). A beta offset value corresponding to one of a first index, a second index, and a third index which are related to beta offsets for the HARQ-ACK information may be applied to the joint encoding. For example, a beta offset value corresponding to one of {betaOffsetACK-Index1, betaOffsetACK-Index2, betaOffsetACK-Index3} may be used in the joint encoding. The first index, the second index, and the third index correspond to a first range, a second range, and a third range, respectively. Each of the ranges may be identified based on the sum of a payload size of CG UCI and a payload size of HARQ-ACK information. For example, if the sum is equal to or less than 2 bits, the sum belongs to the first range. If the sum is equal to or larger than 3 bits and equal to or less than 11 bits, the sum belongs to the second range. If the sum is equal to or larger than 12 bits, the sum belongs to the third range. That is, the value indicated by the index corresponding to the range to which the sum of the payload size of the CG UCI and the payload size of the HARQ-ACK information belongs may be determined to be the beta offset value applied to the joint encoding.

For example, because the sum of the payload size of CG UCI and the payload size of HARQ-ACK information generally exceeds 2 bits, only the second index and the third index may be considered.

Unless contradicting with each other, all of the aforedescribed proposed methods may be implemented in combination.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 19:
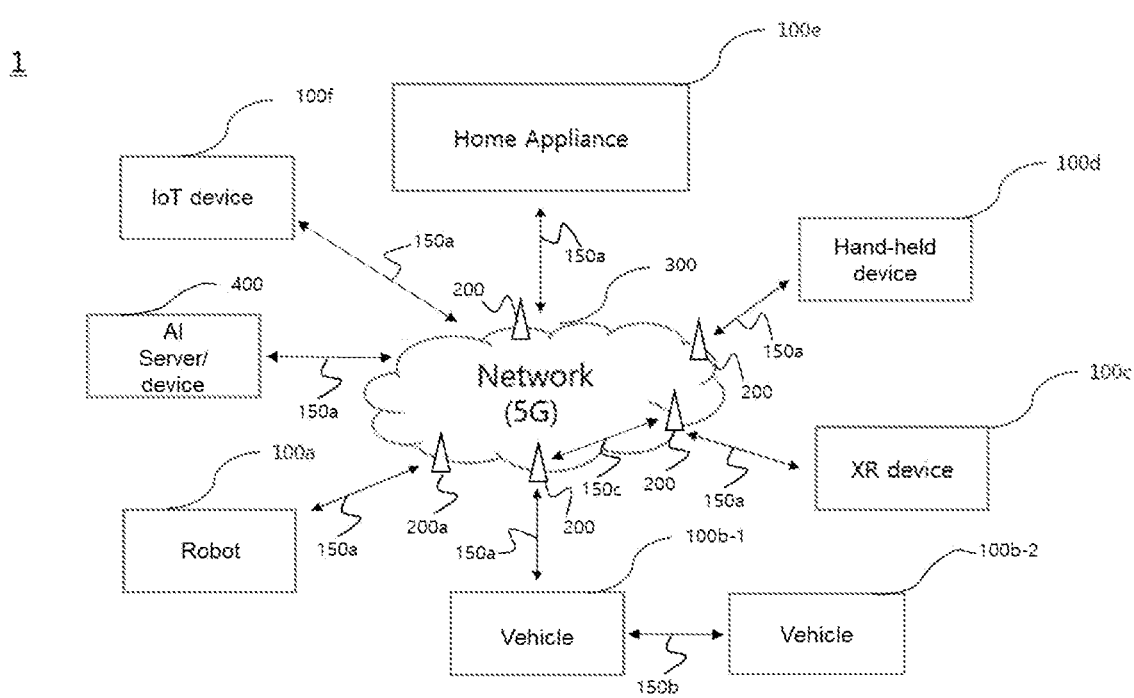
FIG. 19 illustrates an exemplary communication system applied to the present disclosure.

FIG. 19 illustrates a communication system 1 applied to the present disclosure.

Referring to FIG. 19, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smartglasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200*a* may operate as a BS/network node for other wireless devices.

The wireless devices 100*a* to 100*f* may be connected to the network 300 via the BSs 200. An AI technology may be applied to the wireless devices 100*a* to 100*f*, and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 20:
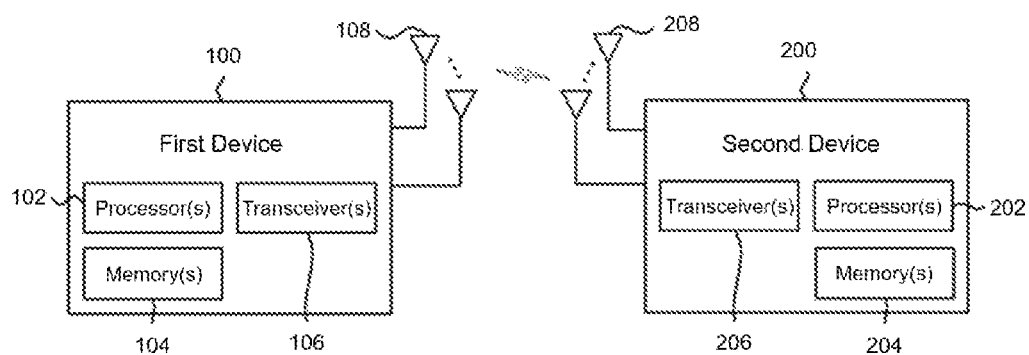
FIG. 20 illustrates an exemplary wireless device applicable to the present disclosure.

FIG. 20 illustrates wireless devices applicable to the present disclosure.

Referring to FIG. 20, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 21:
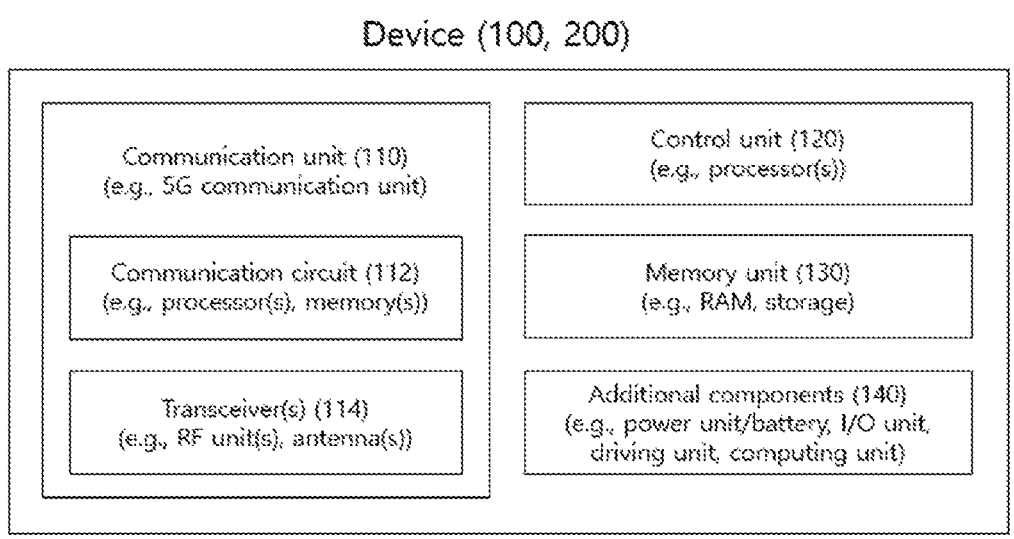
FIG. 21 illustrates another exemplary wireless device applicable to the present disclosure.

FIG. 21 illustrates another example of a wireless device applied to the present disclosure. The wireless device may be implemented in various forms according to a use case/service (refer to FIG. 19).

Referring to FIG. 21, wireless devices 100 and 200 may correspond to the wireless devices 100 and 200 of FIG. 19 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 19), the vehicles (100b-1 and 100b-2 of FIG. 19), the XR device (100c of FIG. 19), the hand-held device (100d of FIG. 19), the home appliance (100e of FIG. 19), the IoT device (100f of FIG. 19), a digital broadcasting terminal, a hologram device, a public safety device, an MTC device, a medical device, a FinTech device (or a finance device), a security device, a climate/environment device, the AI server/device (400 of FIG. 19), the BSs (200 of FIG. 19), a network node, or the like. The wireless device may be mobile or fixed according to a use case/service.

In FIG. 21, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 22:
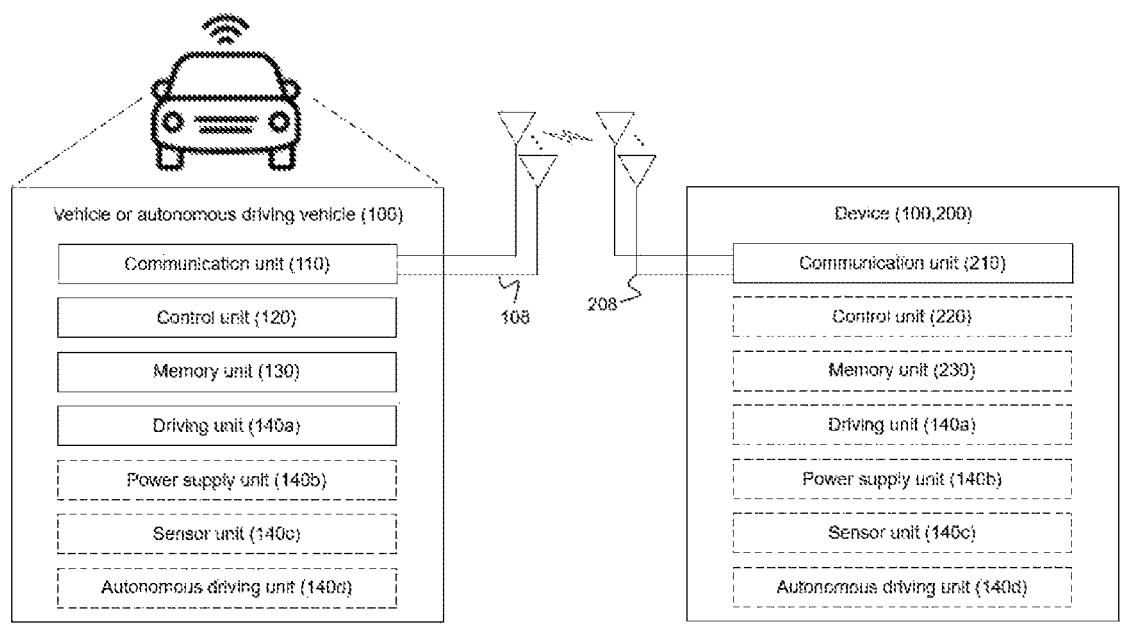
FIG. 22 illustrates an exemplary vehicle or autonomous driving vehicle applicable to the present disclosure.

FIG. 22 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 22, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

The embodiments of the present disclosure have been described above, focusing on the signal transmission and reception relationship between a UE and a BS. The signal transmission and reception relationship is extended to signal transmission and reception between a UE and a relay or between a BS and a relay in the same manner or a similar manner. A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term fixed station, Node B, enhanced Node B (eNode B or eNB), access point, and so on. Further, the term UE may be replaced with the term terminal, mobile station (MS), mobile subscriber station (MSS), and so on.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure may be used in a UE, a BS, or other devices in a mobile communication system.

The invention claimed is:
1. A method of a user equipment (UE) in a wireless communication system, the method comprising:
receiving information indicating multiplexing of Configured Granted (CG)-uplink control information (UCI) and hybrid automatic repeat request acknowledgement (HARQ-ACK) information, performing joint encoding of the CG-UCI and the HARQ-ACK information based on the information indicating multiplexing and a beta offset of the HARQ-ACK information; and transmitting, through a CG-physical uplink shared channel (CG-PUSCH), the CG-UCI and the HARQ-ACK information which are jointly encoded, and wherein an index for the beta offset is determined as one of a plurality of indexes for the beta offset based on a number of information bits which is a combination of bits of the CG-UCI and bits of the HARQ-ACK information.

2. The method according to claim 1, wherein the information indicating multiplexing is received through a higher-layer.

3. A user equipment (UE) in a wireless communication system, the UE comprising:
at least one transceiver;
at least one processor; and
at least one computer memory, operatively connected to the at least one transceiver and the at least one processor, having instructions stored therein that, when executed, cause the at least one transceiver and the at least one processor to perform operations comprising:
receiving, through the at least one transceiver, information indicating multiplexing of Configured Granted (CG)-uplink control information (UCI) and hybrid automatic repeat request acknowledgement (HARQ-ACK) information,
performing joint encoding of the CG-UCI and the HARQ-ACK information based on the information indicating multiplexing and a beta offset of the HARQ-ACK information; and
transmitting, through a CG-physical uplink shared channel (CG-PUSCH) based, through the at least one transceiver, the CG-UCI and the HARQ-ACK information which are jointly encoded, and
wherein an index for the beta offset is determined as one of a plurality of indexes for the beta offset based on a number of information bits combined which is a combination of bits of the CG-UCI and bits of the HARQ-ACK information.

4. The UE of claim 3, wherein the information indicating multiplexing is received through a higher-layer.

5. The UE of claim 3, wherein the UE includes an autonomous driving vehicle communicable with at least one of a network or an autonomous driving vehicle other than the UE.

6. An apparatus for a user equipment (UE), the apparatus comprising:
at least one processor; and
at least one computer memory operatively connected to the at least one processor, having instructions stored therein that, when executed, cause the at least one processor to perform operations comprising:
receiving, through the at least one transceiver, information indicating multiplexing of Configured Granted (CG)-uplink control information (UCI) and hybrid automatic repeat request acknowledgement (HARQ-ACK) information,
performing joint encoding of the CG-UCI and the HARQ-ACK information based on the information indicating multiplexing and a beta offset of the HARQ-ACK information; and
transmitting, through a CG-physical uplink shared channel (CG-PUSCH), the CG-UCI and the HARQ-ACK information which are jointly encoded, and wherein an index for the beta offset is determined as one of a plurality of indexes for the beta offset based on a number of information bits which are a combination of bits of the CG-UCI and bits of the HARQ-ACK information.

7. A non-transitory storage medium which is readable by a processor and storing instructions that cause the processor to perform the method of claim 1.

8. The method of claim 1,
wherein, based on the number of information bits being equal to or less than a value, the index is a first index of the plurality of indexes, and
wherein, based on the number of information bits being larger than a value, the index is a second index of the plurality of indexes.

9. The method of claim 8, wherein the value is 11.

10. The UE of claim 3,
wherein, based on the number of information bits being equal to or less than a value, the index is a first index of the plurality of indexes, and
wherein, based on the number of information bits being larger than a value, the index is a second index of the plurality of indexes.

11. The UE of claim 10, wherein the value is 11.

* * * * *